United States Patent
Ambroise et al.

(10) Patent No.: US 8,980,415 B2
(45) Date of Patent: Mar. 17, 2015

(54) ANTISTATIC FILMS AND METHODS TO MANUFACTURE THE SAME

(76) Inventors: Benoit Ambroise, Hachy (BE); Thomas P. Arys, Antwerp (BE); Sofia M. Kniazeva, Rochester, NY (US)

(*) Notice: Subject to any disclaimer, the term of this patent is extended or adjusted under 35 U.S.C. 154(b) by 398 days.

(21) Appl. No.: 12/960,155

(22) Filed: Dec. 3, 2010

(65) Prior Publication Data

US 2012/0141744 A1    Jun. 7, 2012

(51) Int. Cl.
| | |
|---|---|
| *B32B 7/02* | (2006.01) |
| *B32B 17/10* | (2006.01) |
| *B32B 27/08* | (2006.01) |
| *B32B 1/00* | (2006.01) |
| *B32B 5/00* | (2006.01) |
| *B32B 27/32* | (2006.01) |
| *B32B 7/12* | (2006.01) |
| *B32B 27/28* | (2006.01) |

(52) U.S. Cl.
CPC . *B32B 27/32* (2013.01); *B32B 7/12* (2013.01); *B32B 27/08* (2013.01); *B32B 27/285* (2013.01); *B32B 2255/102* (2013.01); *B32B 2255/26* (2013.01); *B32B 2270/00* (2013.01); *B32B 2307/21* (2013.01); *B32B 2307/75* (2013.01); *B32B 2519/00* (2013.01)
USPC ........ 428/212; 428/195.1; 428/354; 428/409; 428/515; 428/519; 427/209

(58) Field of Classification Search
None
See application file for complete search history.

(56) References Cited

U.S. PATENT DOCUMENTS

| | | | |
|---|---|---|---|
| 4,230,838 | A | 10/1980 | Foy et al. |
| 4,719,263 | A | 1/1988 | Barnhouse et al. |
| 4,931,506 | A | 6/1990 | Yu |
| 5,101,139 | A | 3/1992 | Lechter |
| 5,159,053 | A | 10/1992 | Kolycheck et al. |
| 5,237,009 | A | 8/1993 | Lee |
| 5,298,558 | A | 3/1994 | Sullivan et al. |
| 5,342,889 | A | 8/1994 | Sullivan et al. |
| 5,567,355 | A | 10/1996 | Wessling et al. |
| 5,574,104 | A | 11/1996 | Kolycheck et al. |

(Continued)

FOREIGN PATENT DOCUMENTS

| | | |
|---|---|---|
| EP | 1 167 425 | 1/2002 |
| EP | 1 452 305 | 9/2004 |

(Continued)

OTHER PUBLICATIONS

JPO Machine Translation of JP 2010-188609A cited under Foreign Patents.*

(Continued)

*Primary Examiner* — Mark Ruthkosky
*Assistant Examiner* — Laura C Powers

(57) ABSTRACT

In embodiments herein, the invention relates to a multilayer printable polymeric film including: (a) at least one layer A including one or more polyolefins and having a first side and a second side; (b) a layer B including one or more polyolefins and having a first side and a second side, where the first side of layer B is located on the second side of layer A; and (c) a printable coating located on the first side of layer A; wherein at least one of layer A or B comprises 0.01 to 50.0 wt. % of at least one polyether-polyolefin block copolymer, based on the weight of the polymers comprising the layer; and wherein the multilayer printable polymeric film has a kinetic coefficient of friction less than 0.65; and a surface tension of greater than about 35 mN/m; on one or both sides of the film.

15 Claims, 1 Drawing Sheet

Exemplary Film Structure

(56) References Cited

U.S. PATENT DOCUMENTS

| | | |
|---|---|---|
| 5,604,284 A | 2/1997 | Ueda et al. |
| 5,643,990 A | 7/1997 | Uehara et al. |
| 5,886,098 A | 3/1999 | Ueda et al. |
| 5,914,191 A * | 6/1999 | Hanson et al. ............ 428/409 |
| 6,074,762 A | 6/2000 | Cretekos et al. |
| 6,087,015 A | 7/2000 | Cretekos et al. |
| 6,184,280 B1 | 2/2001 | Shibuta |
| 6,682,822 B2 * | 1/2004 | Cretekos et al. ........... 428/447 |
| 6,875,375 B2 | 4/2005 | Albers et al. |
| 2006/0073318 A1 * | 4/2006 | Tuttle et al. ............... 428/220 |
| 2008/0280111 A1 * | 11/2008 | Blackwell et al. .......... 428/200 |
| 2009/0081474 A1 * | 3/2009 | Keung ........................ 428/516 |
| 2010/0125114 A1 * | 5/2010 | Williams et al. ............. 524/231 |

FOREIGN PATENT DOCUMENTS

| | | | |
|---|---|---|---|
| EP | 1 837 884 | | 9/2007 |
| JP | 2010188609 A | * | 9/2010 |
| WO | WO 91/10237 | | 7/1991 |
| WO | WO 02/074534 | | 9/2002 |
| WO | WO 2009/135998 | | 11/2009 |

OTHER PUBLICATIONS

Varis, *Static Dissipative Compounds: Solutions for Static Control*, Plastics Additives & Compounding, 2001, vol. 3, No. 9, pp. 16-19.

* cited by examiner

Exemplary Film Structure
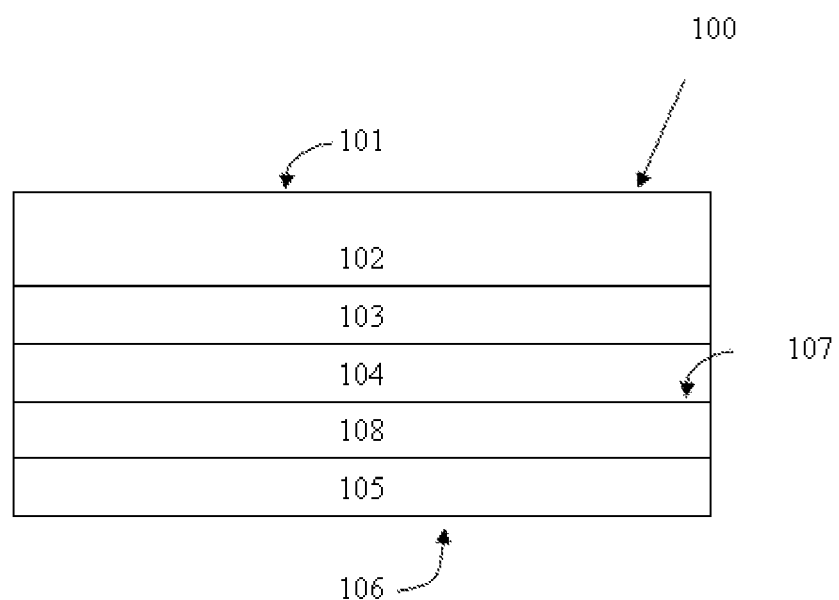

ANTISTATIC FILMS AND METHODS TO MANUFACTURE THE SAME

FIELD OF THE INVENTION

The invention relates to films having antistatic properties. More particularly, the invention relates to films comprising non-migratory antistatic agents and methods of making such films.

BACKGROUND

Static build-up is a common problem in polymeric films and can lead to dust accumulation, decreased machinability (e.g., sheets sticking to each other in the dispenser for sheet-fed label devices, or problems with die cutting because of static interference in label applications), and sudden discharge when roll capacitance is exceeded. This presents not only processing challenges, but also concerns with respect to sudden and large static discharges. It is desirable to mitigate static build-up in films used in packaging for electronic equipment to avoid damage caused by electrostatic discharge.

One solution to such problems is to utilize multi-layer electrostatic dissipative structures, such as those described in U.S. Pat. No. 5,914,191. For example, film structures comprising a core layer including a polymer having a haze value less than 5% and one or more outer layer including of a blend of copolyester and polyetherurethane or polyaniline are known. WO 02/074534 discloses a multi-layer structure comprising at least one electrostatic dissipative outer layer, preferably comprising polyaniline and a conductive core layer. The surface resistivity of the multi-layer structure is less than the surface resistivity of the outer layer alone or in another multi-layer structure absent contact with the conductive core layer. WO 2009/135998 discloses an ungrounded type multilayer packaging comprising a nonconductive multilayer packaging material containing at least one polymeric thermoplastic dissipating layer. The dissipating layer comprises a polymer having polyethylene oxide and polyolefin blocks, thereby providing an electrostatic discharge energy attenuation of more than 40 dB.

Another way to control static in polymeric films is to modify a polymer's antistatic characteristics and dissipative capacity by increasing the rate at which the polymer can dissipate static charge, generally by increasing conductivity. This has been accomplished in the past by the use of various antistatic agents. Incorporation of antistatic agents may be accomplished in a number of ways: application of external antistatic agent as a coat or paint; incorporation of migratory antistatic agents into the external polymer layers; blending conductive fillers into non-conductive polymers; and incorporating inherently conductive polymers (sometimes referred to as "ICPs," which generally have a surface resistivity of $10^1$ to $10^6$ Ohms/square) into the non-conductive polymer.

Also, it is known to employ internal antistatic agents which are volume dispersed by admixing in the polymer, i.e., incorporated into the polymer by compounding or extrusion prior to or during molding or film-forming operations. When used in this manner such internal antistatic agents work by migrating to the polymer surface and absorbing moisture from the air, thereby providing antistatic effect. This migration is colloquially referred to in the art of antistatic polymer technology as a "blooming" or "bleeding" effect. These migratory antistatic agents (e.g., fatty alcohols or esters), however, typically have low molecular weight, and thus are volatile, and tend to be less stable during extrusion. And there migration within the film often leads to undesirable consequences.

Thus, there remains a need for films having a desirable balance of properties that can dissipate charge while maintaining the integrity of the polymer matrix and reducing unwanted migration and/or degradation of the antistatic agent during processing. More particularly, because the surface layer of a film is often coated, there is a need for films where the antistatic agent is embedded or incorporated in the film for stability yet still capable of providing effective antistatic properties, even under a layer of coating.

SUMMARY OF EMBODIMENTS OF THE INVENTION

In one embodiment, the invention relates to a multilayer printable polymeric film comprising: (a) at least one layer A, comprising one or more polyolefins, having a first side and a second side; (b) a layer B, comprising one or more polyolefins, having a first side and a second side, where the first side of B is located on the second side of layer A; and (c) a printable coating located on the first side of layer A; wherein at least one of layer A or B comprises 0.01 to 50.0 wt. % of at least one polyether-polyolefin block copolymer, based on the weight of the polymers comprising the layer; and wherein the multilayer printable polymeric film has a kinetic coefficient of friction less than 0.65; and a surface tension of greater than about 35 mN/m on one or both sides.

In another embodiment, the invention relates to a method for making a printable multilayer polymeric film comprising: (a) forming a layer A, comprising one or more polyolefins, having a first side and a second side; (b) forming a layer B, comprising one or more polyolefins, having a first side and a second side; (c) forming a film comprising layer A and layer B, wherein layer B is on the second side of layer A; and (d) coating the first side of layer A with a printable coating; wherein at least one of layers A and B comprises 0.01 to 50.0 wt. % of at least one polyether-polyolefin block copolymer, based on the weight of the polymers comprising the layer; and wherein the multilayer printable polymeric film has a kinetic coefficient of friction less than 0.65 and a surface tension of greater than 35 mN/m on one or both sides.

In another embodiment, the invention relates to a printable article comprising a multilayer polymeric film having: (a) at least one layer A, comprising one or more polyolefins, having a first side and a second side; (b) a layer B, comprising one or more polyolefins, having a first side and a second side, where the first side of B is located on the second side of layer A; (c) a printable coating located on the first side of layer A; wherein at least one of layer A or B comprises 0.01 to 50.0 wt. % of at least one polyether-polyolefin block copolymer, based on the weight of the polymers comprising the layer; wherein the multilayer printable polymeric film has a kinetic coefficient of friction less than 0.65 and a surface tension of greater than about 35 mN/m on one or both sides.

BRIEF DESCRIPTION OF FIGURES

FIG. 1 represents the structure of an exemplary polymeric multilayer film of the invention.

DETAILED DESCRIPTION

The invention provides films containing one or more polymeric non-migratory antistatic agent(s). The polymeric non-migratory antistatic agents provided in this invention are less volatile than the traditional migratory antistatic agents. Without wishing to be bound by theory, the inventors surmise that the polymer chains of these non-migratory agents are more compatible with polymeric chains of the polymer matrix comprising the film layers, such that these antistatic agents are stable during extrusion and further processing. Moreover, it was found that, surprisingly, these non-migratory antistatic agents continue to afford good antistatic properties even under a layer of coating, for example, on the print side or the adhesive side of a sheet label.

As used herein, the term "film" applies to fabricated articles, extruded or otherwise, may have an overall thickness in the range of about 0.1 to 250 mil (2.5 to 6350 µm).

As used herein, the term "layer" is used to refer to each of the one or more compositions, which may be the same or different, that are secured to one another by any appropriate means such as by an inherent tendency of the materials to adhere to one another, or by inducing the compositions to adhere as by a heating, radiative, chemical, or some other appropriate process. Layers are not limited to detectable, discrete compositions contacting one another such that a distinct boundary exists between the compositions. In some embodiments, the composition used to make one layer of a film will be different (i.e., the wt. % of components, the properties of each component, and/or the identity of the components may differ) from the composition used to make an adjacent layer, when present. A layer includes a finished product having a continuum of compositions throughout its thickness. The films of the present invention are multilayer, that is, comprise two or more layers. A layer may be laminated, by extrusion lamination or other means, to another layer. Films can be fabricated by any mode recognized in the industry, such as film blowing.

As used herein, the term "opaque" in reference to a film that may or may not have voids and includes films that have a low level of translucent character. "White films" are opaque films that whose opacity is provided at least in part by an opacifying agent (e.g., $TiO_2$), rather than by cavitation.

As used herein, the term "polymer" refers to the product of a polymerization reaction, and includes homopolymers, copolymers, terpolymers, etc. For the purposes of this invention and the claims thereto, when a polymer is referred to as comprising a monomer, the monomer present in the polymer is the polymerized form of the monomer, also referred to herein as "derived units". The term "derived units" refers to the polymerized form of the monomer from which the polymer was derived. For example, polyethylene comprises ethylene derived units, and a terpolymer of propylene/ethylene/butene comprises propylene derived units, ethylene derived units and butene derived units.

A "propylene-based" polymer refers to a polymer comprising greater than 50.0 wt. % of propylene derived units.

For purposes of this invention and the claims thereto, the term "copolymer" means any polymer comprising two or more different monomers, where "different" means differing by at least one atom, such as the number of carbons. For example, ethylene is a different monomer from propylene, because ethylene has two carbon atoms while propylene has three carbon atoms. Accordingly, the term "copolymer" includes the copolymerization reaction product of propylene and an alpha-olefin (α-olefin), such as ethylene. The term "copolymer" is also inclusive of, for example, the copolymerization of a mixture of more than two monomers, such as terpolymers. A "terpolymer" is a polymer consisting of three monomers that are different from each other, for example, an ethylene-propylene-butene terpolymer.

A "polyolefin" comprises one or more olefin derived units. Exemplary polyolefins include polyethylene, polypropylene, ethylene-propylene copolymers, ethylene-propylene-butene terpolymers, and the like. For the purposes of this invention and the claims thereto, when a polymer is referred to as "comprising an olefin," the olefin present in the polymer is the polymerized form of the olefin. An "olefin," alternatively referred to as "alkene," is a linear, branched, or cyclic compound of carbon and hydrogen having at least one double bond. An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having at least 100 mer units.

Films

Multilayer polymeric films having improved antistatic properties are disclosed herein. The films of the invention are useful as labels, preferably printable labels, and are particularly useful in the cut-and-stack labeling method. Labels containing these films have applications such as for labeling containers, e.g., bottles or cans, for beverages or other liquid products such as lotions, beauty supplies, or cleaning solutions. The films of the invention may also be useful as printable bags.

To facilitate discussion of different film structures, the following notation is used herein. Each layer of a film is denoted "A" or "B", where "A" indicates a film layer comprising at least one non-migratory antistatic agent, as discussed below, and "B" indicates a film layer comprising a propylene-based polymer, as discussed below. Films may also include additional layers, such as a layer C, comprising material different from either layer A or layer B. For example, layer C may comprise a substrate, a coating, or another polymeric resin. Where a film has more than one layer, the layers may be the same or different. For example, where a film has more than one layer B, the layers B may be the same or different. Finally, the symbols for adjacent layers are separated by a slash (/). Using this notation, a three-layer film having an inner layer of a propylene-based polymer disposed between a layer comprising at least one nonmigratory antistatic agent, and a layer of adhesive would be denoted A/B/C. Similarly, a four-layer film having an composition of an outer coating layer, layer comprising at least one nonmigratory antistatic agent, a inner layer of a propylene-based polymer, and a layer of adhesive may be denoted C/A/B/C. Unless otherwise indicated, the left-to-right or right-to-left order of layers does not matter; e.g., a C/A/B/C film is equivalent to a C/B/A/C film.

"Outer" and "inner," as used herein in reference to layers, refer to the relative spatial disposition of the layers. For example, for a layer configuration such as C/A/B/C, layer A is outer with respect to layer B, and each layer B is inner with respect to layer A. In embodiments herein, each layer A is spatially disposed outwards relative to a layer B. Also, layers herein have a first side and a second side. Therefore, for a layer configuration such as A/B/C, with respect to layer A, the first side is outermost, the second side is in contact with layer B. Also, for a layer configuration such as A/B/B/B/B/C, where the order of the layers is important, layer A may be referred to as the "outer skin" layer, because it is the outermost layer of the film composition, facing the outside. Similarly, layer C may be referred to as the "inner skin" layer, because the layer C is spatially disposed as the innermost layer of the film composition facing the inside.

The thickness of each layer of the film, and of the overall film is determined according to the desired properties of the film. Typical film layers have a thickness of from about 1 to about 10,000 µm, more typically from about 5 to about 1,000 µm, and typical films have an overall thickness of from about 10 to about 100 µm.

In further applications, microlayer technology may be used to produce films with a large number of thinner layers. For example, microlayer technology may be used to obtain films having, for example, 24, 50, or 100 layers, in which the thickness of an individual layer is less than 1 μm. Individual layer thicknesses for these films may be less than 0.5 μm, less than 0.25 μm, or even less than 0.1 μm.

The multilayer polymeric films can have any number of layers in any ratio of thicknesses. In a preferred embodiment, a three layer film is produced having an outer skin layer, a middle core layer, and an inner skin layer in a ratio within a range of from 1/1/1 to 1/20/1 in one embodiment, and from 1/2/1 to 1/15/1 in another embodiment, and from 1/3/1 to 1/10/1 in yet another embodiment. Each layer can be any desirable thickness, and is within the range of from 1 to 100 μm in one embodiment, and from 2 to 80 μm in another embodiment, and from 2 to 60 μm in yet another embodiment, and from 3 to 40 μm in yet another embodiment, and from 4 to 15 μm in yet another embodiment. Given the variety of film structures as mentioned above (e.g., ABC, CABAC, etc.), the total film thickness can vary greatly. In one embodiment, the total film thickness or "film thickness" is within the range from 10 to 500 μm, and from 20 to 400 μm in another embodiment, and from 30 to 300 μm in yet another embodiment, and from 40 to 200 μm in yet another embodiment, and from 50 to 150 μm in yet another embodiment. Of course, a desirable thickness range of the layers and film can comprise any combination of an upper limit with any lower limit, as described herein.

Films described herein have a surface resistivity, as defined by ASTM D 257. The surface resistivity is the surface resistance multiplied by that ratio of specimen surface dimensions (width of electrodes defining the current path divided by the distance between electrodes) which transforms the measured resistance to that obtained if the electrodes had formed the opposite sides of a square. Surface resistivity is expressed in ohms. It is popularly expresses also as ohms/square (the size of the square is immaterial). Surface resistivity is the reciprocal of surface conductivity. (See ASTM D 257-07, 3.1.10 and 3.1.10.1).

In embodiments herein, the multilayer polymeric films comprise at least one layer A and at least one layer B, wherein layer A comprises a non-migratory antistatic agent, as discussed herein.

In addition to layer A comprising the non-migratory antistatic agent and layer B, the polymeric film of this invention may comprise any number of additional layers C to achieve different objectives, such as adhesion promotion, abrasion resistance, curl control, moisture barrier, conveyance, print retention, etc.

Specifically, in embodiments herein, multilayer polymeric films comprise: (a) at least one layer A, comprising one or more polyolefins, having a first side and a second side; (b) a layer B, comprising one or more polyolefins, having a first side and a second side, where the first side of B is located on the second side of layer A; and (c) a printable coating located on the first side of layer A; wherein at least one of layer A or B comprises 0.01 to 50.0 wt. % of at least one polyether-polyolefin block copolymer, based on the weight of the polymers comprising the layer; wherein the multilayer printable polymeric film has a kinetic coefficient of friction less than 0.65 and a surface tension of greater than about 35 mN/m on one or both sides.

FIG. 1 shows an exemplary film structure 100, used herein to discuss the various components. Film structure 100 comprises five layers: a printable coating layer 102, a layer A 103, a layer B 104, a primer coating 108, and an adhesive coating 105. Film structure 100 also has a print side 101 and an adhesive side 106.

The first side of layer A, may be coated, by a printable coating 102, to render the film printable. As used herein, the term "printable" means having suitable properties to permit good quality printed results, such as uniformity of printed color, uniformity of ink transfer, good quality of black-and-white image, and consistency of ink drying and setting (See, Encyclopedia of Labels and Label Technology, M. Fairley, Taurus Publishing Ltd.). A printable layer may be applied by any conventional extrusion or coating method. Certain water-based coatings are known for their utility as printable coatings, for example, acrylic-based coatings including alkyl acrylate polymers and copolymers.

Layer A, 103, may also be treated, prior to coating, so as to enhance printability. This includes surface treatment of any kind to enhance the surface tension properties, such as flame or corona treatment, as discussed below. The surface treatment may improve wettability and adhesion of printed matter (print may be by lithography, liquid or dry toner, thermal dyes, dye sublimation, etc.).

With respect to FIG. 1, the second side of layer A is located on the first side of layer B. As used herein, a layer being "located on" a particular side of another layer (e.g., layer A "located on" the first side of layer B) refers only to the location of that layer with respect to the other layer; the phrase "located on" does not require that layer to be directly adjacent to, or in full or partial contact with, the other layer, and includes embodiments with tie layers between the two layers described (e.g., between layer A and layer B).

The layer B, 104, may comprise one layer, or alternatively may comprise more than one layer. In embodiments herein, layer B may comprise two, three, four, five, six, seven, eight, or more layers. In preferred embodiments, layer B is multilayer. In particularly preferred embodiments, layer B consists of five layers.

In some embodiments, the outer layers of layer B may be treated so as to enhance the surface tension properties, such as flame or corona treatment. In FIG. 1, the second side of layer B (107) is corona treated.

Further, with respect to FIG. 1, the second side of layer B may be coated by a primer coating 108. The second side of the primer coating may be, in turn, coated by an adhesive primer 105.

The layers A and B, printable coating, and the polyether-polyolefin block copolymer, and their respective components are described further below.

Polymeric Non-Migratory Antistatic Agents

Polyether-polyolefin block copolymers are useful in the inventive films as polymeric non-migratory antistatic agents. "Non-migratory" as used herein, indicates that the antistatic agents migrate or "bloom" at a slower rate than migratory antistatic agents. The rate of migration of the antistatic agent may be measured by any means known in the art, such as by monitoring surface resistivity, static decay, and weight loss of the sample over a range of thermoforming temperatures. For the purposes of claiming the invention, "slower" means that the rate of migration of the antistatic is at least 10% less than a comparative film containing a migratory antistatic agent such as ARMOSTAT 475 (epoxylated tertiary amine; AkzoNobel Polymer Chemicals, Chicago, Ill.) present at 1 wt. % in the same layer in place of the non-migratory antistatic agent.

Generally, the non-migratory antistatic agents of the present invention comprise (i) an inherently dissipative polymer (IDP), such as a polyether-polyolefin block copolymer;

and, optionally, (ii) a compatibilizer, such as a propylene-based polymer. Other additives may be added to the non-migratory antistatic agent, for example, antioxidants may be added to provide UV stability and better processing stability, and pigments may be added to provide color. In particular embodiments, the non-migratory antistatic compound comprises at least one antioxidant.

In multilayer printable polymeric films herein, the polyether-polyolefin block copolymer is a non-migratory antistatic agent; and preferably the polyether-polyolefin block copolymer is provided as a blend of: (i) 5.0 to 100 wt. % of at least one polyether-polyolefin block copolymer based on the weight of the polymers in the non-migratory antistatic agent, preferably 10 to 90 wt. %, preferably 25.0 to 80 wt. %, or preferably 5.0 to 50.0 wt. %; and (ii) 50 to 95.0 wt. % of at least one propylene-based polymer, preferably 65.0 to 95.0 wt. %, or from about 75.0 to about 95.0 wt. %; based on the combined weights of (i) and (ii); and (iii) optionally, at least one antioxidant.

(i) Inherently Dissipative Polymer (Polyether-Polyolefin Block Copolymer)

In embodiments herein, the non-migratory antistatic agent comprises in the range of 5.0 to 50.0 wt. % of at least one polyether-polyolefin block copolymer, based on the combined weights of the propylene-based polymer and the polyether-polyolefin block copolymer. In other embodiments, the non-migratory antistatic agent comprises in the range of 15.0 to 50.0 wt. % of at least one polyether-polyolefin block copolymer, or preferably in the range of 25.0 to 35.0 wt. % of at least one polyether-polyolefin block copolymer.

In particular embodiments herein, the polyether-polyolefin block copolymers comprise: (i) at least 50 mole % polyether blocks, at least 60 mole % polyether blocks, or at least 70 mole % polyether blocks; (ii) a number average molecular weight (Mn) in the range of from about 2,000 to 200,000 g/mol, from 3,000 to 150,000 g/mol, from 5,000 to 125,000 g/mol, or from 5,000 to 60,000 g/mol, as determined by gel permeation chromatography (GPC); and (iii) a surface resistivity of $10^5$ to $10^{11}$ Ohms/square, as measured by ASTM D257.

In embodiments herein, the polyether-polyolefin block copolymer is a block polymer which has a structure such that blocks of a polyolefin and blocks of a hydrophilic polymer are bonded together alternately and repeatedly, as disclosed in EP 1 452 305. Preferably, the blocks of the hydrophilic polymer are polyether blocks. In preferred embodiments, the polyether-polyolefin block copolymers comprise at least 50 mole % polyether blocks, at least 60 mole % polyether blocks, or at least 70 mole % polyether blocks.

The polyether blocks can be formed from one or more alkylene oxides having 2 to 4 carbon atoms. The polyether blocks can comprise ethylene oxide, propylene oxide, or butylene oxide, or combinations thereof. In preferred embodiments, the polyether blocks may be modified, for example, to have diol groups available for reaction with a modified polyolefin block, preferably one hydroxyl group at each polyether terminus.

Typically, the polyolefin blocks are obtained by polymerization of one or a mixture of two or more olefins containing 2 to 30 carbon atoms, preferably containing 2 to 12 carbon atoms, preferably propylene and/or ethylene. Alternatively, low molecular weight polyolefins blocks can be obtained by thermal degradation of high molecular weight olefins. The Mn of the polyolefin block is preferably 800 to 20,000 g/mol. (See, EP 1 452 305). The polyolefin block may be modified to have carbonyl groups at both polyolefin block termini.

A polyether-polyolefin block copolymer can be formed by the reaction of a mixture comprising a modified polyether and a modified polyolefin, such as described in EP 1 167 425. For example, one or more polyether reactants such as polyether diols can be reacted with polyolefin reactants (obtained by modifying the termini of the polyolefin with carbonyl-containing groups or the like) and a polycondensation polymerization reaction carried out, at a temperature in the range of from about 200° C. to about 250° C., under reduced pressure, and employing catalysts such as zirconium acetate.

In a particular embodiment, the polyether-polyolefin block copolymer is a block polymer having a structure such that the polyolefin block and the polyether block are bonded together alternately and repeatedly, such that the polymers have a repeating unit represented by the following formula (1).

Formula (1)

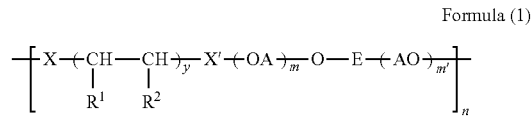

In Formula (1), n is an integer in the range of from 2 to 50; one of $R^1$ and $R^2$ is a hydrogen atom and the other is a hydrogen atom or an alkyl group containing 1 to 10 carbon atoms; y is an integer in the range of from 15 to 800; E is the residue of a diol after removal of the hydroxyl groups; A is an alkylene group containing 2 to 4 carbon atoms; m and m' each represents an integer in the range of from 1 to 300; and X and X' are connecting groups used in the synthesis of the block polymer as described in EP 1 167 425, hereby incorporated by reference.

In preferred embodiments, the polyether-polyolefin block copolymers comprise ethylene oxide polyether blocks. In such preferred embodiments, the polyether-polyolefin block copolymers comprise at least 50 mole % ethylene oxide (polyether blocks), at least 60 mole % ethylene oxide, or at least 70 mole % ethylene oxide.

In a particularly preferred embodiment, the polyether-polyolefin block copolymer comprises a block copolymer of polyethylene oxide polyether segments with polypropylene and/or polyethylene polyolefin segments. In one embodiment, the polyether-polyolefin block polymer has a Mn in the range of from about 2,000 to 200,000 g/mol, from 3,000 to 150,000 g/mol, from 5,000 to 125,000 g/mol, and from 5,000 to 60,000 g/mol, as determined by GPC. GPC techniques for determining the molecular weight (Mn and Mw, weight average molecular weight) and molecular weight distribution (Mn/Mw) may be found in U.S. Pat. No. 4,540,753, which is incorporated by reference herein, and in Macromolecules 1988, 21, 3360, which is also incorporated by reference herein.

A preferred polyether-polyolefin block copolymer is PELESTAT® 300, commercially available from Sanyo Chemical Industries, Ltd. (Tokyo, Japan) or Toyota Tsushu America Inc. (Houston, Tex.), which is described in EP 1 167 425. Such a polyether-polyolefin block copolymer is a block polymer which has a structure such that blocks of a polyolefin and blocks of a hydrophilic polymer are bonded together alternately and repeatedly, and has a surface resistivity in the range of from about $10^5$ to $10^{11}$ Ohms/square, as measured by ASTM D257. Preferred polyether-polyolefin block copolymers include polyethylene oxide-polyethylene block copolymers, polyethylene oxide-polypropylene block copolymers, and the like.

Some polyether-polyolefin block copolymers such as PELESTAT® 300 do not require a compatibilizer, and, therefore, compatibilizers can be substantially absent from the non-migratory antistatic agent. In such embodiments, the non-migratory antistatic agent comprises polyether-polyolefin block copolymers in the range of 90 to 100 wt. %, based on the total weight of the non-migratory antistatic agent.

Any polyether-polyolefin block copolymer may be used in the non-migratory antistatic agents herein, preferably making the surface resistivity of the resultant film less than $10^{12}$ ohms/square. Some examples of commercially available polyether-polyolefin block copolymers include IonPhasE® IPE®, (IonomerPolyElectrolyte), available from IonPhasE Oy; and PELESTAT®, available from Toyota Tsushu America Inc., in particular PELESTAT® 300.

The polyether-polyolefin block copolymers useful herein have desirable electrical properties. Without wishing to be bound by theory, it is thought that ionic conduction along the polyether chains makes these polymers inherently dissipative, yielding surface resistivities in the range of from about $10^6$-$10^{12}$ ohms/square. (See, "Static dissipative compounds: solutions for static control," Plastics Additives & Compounding, September 2001, Table 1.) Advantageously, these polymeric substances have dissipative properties, which are relatively independent of relative humidity (RH), unlike traditional migratory antistatic agents. Even more advantageously, polymeric substances containing a high concentration of polyether blocks may be melt-processed while retaining their antistatic property and overall physical performance. (See, WO 02/074534, page 6).

(ii) Compatibilizer (Propylene-Based Polymer)

In embodiments herein, the non-migratory antistatic agent comprises in the range of from about 50 to 95.0 wt. % of at least one propylene-based polymer, based on the combined weights of the propylene-based polymer and the polyether-polyolefin block copolymer. In other embodiments, the non-migratory antistatic agent comprises in the range of from about 65.0 to 95.0 wt. % of the propylene-based polymer, or from about 75.0 to about 95.0 wt. % of the propylene-based polymer, based on the combined weights of the propylene-based polymer and the polyether-polyolefin block copolymer.

The propylene-based polymer has greater than 50 mole % propylene, greater than 60 mole % propylene, greater than 70 mole % propylene, greater than 80 mole % propylene, or greater than 90 mole % propylene. In some embodiments, the propylene-based polymer is a propylene homopolymer.

Some polyether-polyolefin block copolymers may require a compatibilizer to obtain the necessary miscibility with polyolefins, as will be understood by one of ordinary skill in the art. Also, IDPs, such as the polyether-polyolefin block copolymer described above, typically have less than robust mechanical properties and may not be feasible on their own as packaging materials. However, when alloyed with traditional packaging polymers, the result is a system that combines the desirable mechanical properties of the host polymer with the electrical properties of the IDP. This alloying approach provides a polymer that can be injection molded, extruded, or thermoformed without deteriorating either the electrical or the mechanical properties. Moreover, these alloys can be designed to be clear and colorable, unlike traditional filler-based conductive compounds. Additionally, using IDPs instead of more traditional filler-based conductive compounds, particularly carbon black compounds, introduces no particulate contaminants to the polymer and typically contains only trace amounts of anions, cations, or offgassing materials. (See, "Static dissipative compounds: solutions for static control," Plastics Additives & Compounding, September 2001, pages 16-19.)

Compatibilizers may be low molecular weight polymers with functional groups that are compatible with both the polyether-polyolefin block copolymers and the polymer in which it is being blended into for the final use, which may be otherwise immiscible or non-compatible. For example, compatibilizers useful herein may have functional groups that are compatible both with the IDP (polyether-polyolefin block copolymer) and the polymers of layer A. Accordingly, the compatibilizer allows the polyether-polyolefin block copolymers and the blending polymer to be uniformly dispersed.

Any compatibilizer which can ensure compatibility between the polyether-polyolefin block copolymer and the blending polymer (polymers of layer A) by way of controlling phase separation and polymer domain size may be employed, such as those described in U.S. Pat. No. 6,436,619; EP A 0 342 066; and EP A 0 218 665. Some examples of compatibilizers are: polyethylene, polypropylene, ethylene/propylene copolymers, ethylene/butene copolymers, all these products being grafted with maleic anhydride or glycidyl methacrylate; ethylene/alkyl(meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/(meth)acrylic acid copolymers and optionally their salts; ethylene/alkyl(meth)acrylate/glycidyl methacrylate copolymers, the glycidyl methacrylate being grafted or copolymerized, grafted copolymers constituted by at least one mono-amino oligomer of polyamide and of an alpha-mono-olefin (co)polymer grafted with a monomer able to react with the amino functions of said oligomer.

Some preferred compatibilizers are terpolymers of ethylene/methyl acrylate/glycidyl methacrylate and copolymers of ethylene/glycidyl methacrylate, such as those commercially available as LOTADER from Arkema Inc. (Houston, Tex.), or similar products. Preferred compatibilizers also include maleic anhydride grafted or copolymerized polyolefins such as polypropylene, polyethylene, etc., such as those commercially available as OREVAC from Arkema Inc., or similar products.

(iii) Antioxidant

The non-migratory antistatic agent may further comprise at least one antioxidant. Where present, the at least one antioxidant is in the range of about 0.05 to about 2.0 wt. %, based on the weight of (i) and (ii), preferably from about 0.5 to about 1.5 wt. %, or from about 0.75 to about 1 wt. %. In some embodiments, more than one antioxidant may be used, two or more, or three or more.

Any antioxidant suitable for use in films may be used herein. Particularly useful antioxidants include, for example, hindered phenols such as 2,6-di-tert-butyl-4-methylphenol; 1,3,5-trimethyl-2,4,6-tris(3',5'-di-t-butyl-4'-hydroxybenzyl)-benzene; tetrakis [(methylene (3,5-di-t-butyl-4-hydroxyhydrocinnamate)]methane (commercially available as IRGANOX™ 1010, Ciba Geigy, N.Y.); tris(2,4-ditert-butylphenyl) phosphite (commercially available as IRGANOX™ 168, Ciba Geigy); octadecyl-3,5-di-t-butyl-4-hydroxy cinnamate (commercially available as IRGANOX™ 1076, Ciba Geigy); tert-butylhydroquinone (TBHQ); propyl gallate (PG); butylated hydroxyanisole (BHA); and butylated hydroxytoluene (BHT). Other antioxidants useful herein are described in U.S. Pat. Nos. 5,143,968 and 5,656,698, incorporated herein by reference.

In particular embodiments, the antioxidant comprises IRGANOX 1010. In particularly preferred embodiments, the antioxidant comprises both IRGANOX 1010 and IRGANOX 168, preferably in equal parts, as disclosed in EP 1 837 884.

The antioxidant is blended with the other components of the non-migratory antistatic agent. Generally, at least 1 wt. % of the antioxidant is incorporated into the non-migratory antistatic agent. In some embodiments, if necessary for uniform dispersion, a dispersing agent may be premixed with the antioxidant, or fed simultaneously to a mixing hopper.

In embodiments herein, the non-migratory antistatic agent comprises: 5.0 to 100 wt. % of at least one polyether-polyolefin block copolymer, based on the weight of polymers comprising the non-migratory antistatic agent; preferably 10 to 90 wt. %; preferably 25.0 to 80 wt. %; or preferably 5.0 to 50.0 wt. %.

In other embodiments, the non-migratory antistatic agent is provided as a blend and comprises (i) 5.0 to 50.0 wt. % of at least one polyether-polyolefin block copolymer, based on the combined weights of (i) and (ii); and (ii) 50 to 95.0 wt. % of at least one propylene-based polymer, based on the combined weights of (i) and (ii). In some embodiments, the non-migratory anti-static agent further comprises at least one antioxidant.

Commercially available non-migratory antistatic agents provided as a blend and useful herein include those available from Premix Oy (Rajamaki, Finland) under the tradename PRE-ELEC®, for example, PRE-ELEC® ESD 5050, PRE-ELEC® ESD 5060, and PRE-ELEC® TP 11515.

Alternatively, the non-migratory antistatic agent may comprise any combination of the polyether-polyolefin block copolymers and propylene-based copolymers disclosed herein. Each of the components of the non-migratory antistatic agent, namely the IDP (polyether-polyolefin block copolymer), the compatibilizer (propylene-based polymer), and the optional antioxidant, is discussed further below.

Non-migratory antistatic agents useful herein typically have a melt flow index in the range of from about 0.5 to about 100 g/10 min, from about 2 to about 75 g/10 min, or from about 5 to about 50 g/10 min, as measured by ASTM D-1238, 230° C., 2.16 kg.

In embodiments herein, the non-migratory anti-static agent comprises: (i) 5.0 to 100 wt. % of at least one polyether-polyolefin block copolymer based on the weight of the polymers in the non-migratory antistatic agent, preferably 10 to 90 wt. %, preferably 25.0 to 80 wt. %, or preferably 5.0 to 50.0 wt. %, and optionally (ii) 50 to 95.0 wt. % of at least one propylene-based polymer; based on the combined weights of (i) and (ii); and optionally (iii) at least one antioxidant.

Compounding

When compatibilizers, such as the propylene-based polymer described above, are blended with IDPs under certain compounding conditions, the formation of an interpenetrating network (IPN) structure has been reported. (See, "Static dissipative compounds: solutions for static control," Plastics Additives & Compounding, September 2001, pages 16-19.) The IPN structure is reported to provide a polymeric, self-organizing, three dimensional interpenetrated network which is thought to allow charges to flow through the entire volume instead of only at the surface. Advantageously, the chance of creating hot spots is substantially reduced.

The components of the non-migratory antistatic agent may be compounded, preferably to form an IPN structure, before incorporation of the non-migratory antistatic agent into layer A. The formation of the IPN can be achieved by not overworking or overheating the components. (See, "Static dissipative compounds: solutions for static control," Plastics Additives & Compounding, September 2001, page 18.)

In some embodiments herein, the non-migratory antistatic agent may be compounded by first mixing the propylene-based polymer, polyether-polyolefin block copolymer into one another in a rapid mixer such that a highly flowable pulver is achieved. Next, the other components, such as the antioxidant(s), may be mixed with the pulver and the mixture may be compounded, such as in a Berstorf ZE 40 twin-screw extruder. The turning of the screw of the extruder and the mixing conditions preferably enables a high shear rate in the range of from about 500 to about 5000 $s^{-1}$ to be achieved. The formation of an IPN is more likely with a high shear rate, as disclosed in EP 1 837 884.

Migratory Antistatic Agents

For comparative purposes only, migratory antistatic agents are briefly discussed herein. Examples of migratory antistatic agents known in the art include alkali metal sulfonates, polyalkylphenylsiloxanes, tertiary amines, glycerol monostearate (GMS), and a blend of GMS and tertiary amine. A frequently used migratory antistatic agent is a tertiary ethoxylated amine, such as that marketed as ARMOSTAT 475 by AkzoNobel Polymer Chemicals (Chicago, Ill.).

In the reference film of the Examples, ARMOSTAT 475 is used instead of the non-migratory antistatic agent in layer A. Suitable amounts for the migratory antistatic agent in layer A of the reference film may range from about 0.1 wt. % to about 35.0 wt. %, about 0.5 wt. % to about 25.0 wt. %, or about 0.5 wt. % to about 5.0 wt. %, based on the weight of layer A.

Layer A

The multilayer polymeric films of the invention comprise at least one layer A. Layer A has a first side and a second side. Preferably, the first side of layer A is coated. Preferably, the layer A comprises polyolefins, preferably propylene-based polymers having properties suitable for extrusion or coextrusion, followed by biaxial orientation in the machine and transverse directions, to the same or different extents, at elevated temperatures, so as to form a multi-layer film. The polyolefins, preferably propylene-based polymers, of layer A may also be useful in layer B. Accordingly, the polyolefins, preferably propylene-based polymers, useful in layers A and B are described below in the discussion for layer B.

In some embodiments, layer A comprises at least one polyether-polyolefin block copolymer, as described above. In particular embodiments, the at least one polyether-polyolefin block copolymer is present in layer B in an amount in the range of from about 0.01 to 50.0 wt. %, preferably about 5.0 wt. % to about 40.0 wt. %, or preferably about 5.0 wt. % to about 35.0 wt. %, based on weight of the polymers comprising the layer.

In preferred embodiments herein, each layer A comprises (i) at least one non-migratory antistatic agent, as described above; and (ii) at least one propylene-based polymer.

Layer B

The films of the invention comprise at least one layer B. Layer B may comprise one layer, or alternatively may comprise more than one layer. In embodiments herein, layer B may comprise two, three, four, five, six, seven, eight, or more layers. In preferred embodiments, layer B is multilayer. In particularly preferred embodiments, layer B consists of four or more layers.

Layer B has a first side and a second side. In embodiments herein, each layer B comprises polyolefins. Preferably, the layer B comprises propylene-based polymers having properties suitable for extrusion or coextrusion, followed by biaxial orientation in the machine and transverse directions, to the same or different extents, at elevated temperatures, so as to form a multi-layer film. Further, in some embodiments, layer B comprises non-conductive polymers. "Non-conductive polymer" as used herein, means a polymer that has a surface resistivity of greater than $10^{12}$ Ohms/square.

In other embodiments, layer B comprises at least one polyether-polyolefin block copolymer, as described above. In particular embodiments, the at least one polyether-polyolefin block copolymer is present in layer B in an amount in the range of from about 0.01 to 50.0 wt. %, preferably about 5.0 wt. % to about 40.0 wt. %, or preferably about 5.0 wt. % to about 35.0 wt. %, based on weight of the polymers comprising the layer. In yet other embodiments, both of layers A and B comprise at least one non-migratory antistatic agent, where the antistatic agent in layer A may be the same as or different from the antistatic agent in layer B.

In some embodiments, the second side of layer B is coated; preferably the coating is an adhesive primer.

As above, the propylene-based polymers of layer B may also be useful in layer A. Accordingly, the propylene-based polymers useful in layers A and B are described below.

Propylene-Based Polymers of Layers A and B

Layers A and/or B of the multilayer polymeric films herein comprise propylene-based polymers. Propylene-based polymers useful herein include isotactic, syndiotactic, and atactic forms of propylene homopolymer, as well as propylene-based copolymers inclusive of random copolymers and terpolymers, and mixtures thereof useful in film applications. The copolymer can be a random copolymer, a statistical copolymer, a block copolymer, and blends thereof. In particular, the propylene-based polymers useful herein include impact copolymers, elastomers, and plastomers, any of which may be physical blends or in situ blends with the polypropylene. Suitable polymers include at least one of a polypropylene, propylene-ethylene copolymer, propylene-butene copolymer, or propylene-ethylene-butylene terpolymer.

The method of making the polypropylene is not critical, as it can be made by slurry, solution, gas phase, or other suitable processes, and by using catalyst systems appropriate for the polymerization of polyolefins, such as Ziegler-Natta-type catalysts, metallocene-type catalysts, other appropriate catalyst systems, or combinations thereof. In a preferred embodiment the propylene-based polymers are made by the catalysts, activators and processes described in U.S. Pat. Nos. 5,741,563; 6,342,566; and 6,384,142; WO 03/040201; and WO 97/19991. Likewise the copolymers may be prepared by the processes described in U.S. Pat. Nos. 6,342,566 and 6,384,142. Such catalysts are known in the art, and are described in, for example, ZIEGLER CATALYSTS (Gerhard Fink, Rolf Muelhaupt and Hans H. Brintzinger, eds., Springer-Verlag 1995); Resconi et al., *Selectivity in Propylene Polymerization with Metallocene Catalysts*, 100 CHEM. REV. 1253-1345 (2000); and I, II METALLOCENE-BASED POLYOLEFINS (Wiley & Sons 2000).

Preferred propylene-based polymers useful in this invention have one or more of the following properties: (i) a Mw of 30,000 to 2,000,000 g/mol, preferably 50,000 to 1,000,000 g/mol, or more preferably 90,000 to 500,000 g/mol, as measured by gel permeation chromatography (GPC); (ii) a Mw/Mn of 1 to 40, preferably 1.6 to 20, more preferably 1.8 to 10, or more preferably 1.8 to 3, as measured by GPC; (iii) a Tm (melting point, second melt) of 30 to 200° C., preferably 30 to 185° C., preferably 50 to 175° C., or more preferably 60 to 170° C., as measured by DSC; (iv) a crystallinity of 5 to 80%, preferably 10 to 70%, or more preferably 20 to 60%, as measured by DSC; (v) a glass transition temperature (Tg) of −40° C. to 20° C., preferably −20° C. to 10° C., or more preferably −10° C. to 5° C., as measured by differential scanning calorimetry (DSC); (vi) a heat of fusion (Hf) of 180 J/g or less, preferably 20 to 150 J/g, or more preferably 40 to 120 J/g as measured by DSC; and (vii) a crystallization temperature (Tc) of 15 to 120° C., preferably 20 to 115° C., or more preferably 25 to 110° C., as measured by DSC.

The propylene-based polymer may be a propylene homopolymer. In such embodiments, the propylene homopolymer has (i) a molecular weight distribution (Mw/Mn) of up to 40, preferably in the range of from 1.5 to 10, from 1.8 to 7, from 1.9 to 5, or from 2.0 to 4; and (ii) a melt-mass flow rate (MFR) in the range of from 0.1 g/10 min to 2500 g/10 min, from 0.3 to 500 g/10 min, or from 1 to 100 g/10 min, as measured by ASTM D 1238, 230° C., 2.16 kg.

In some embodiments of the invention, the propylene-based polymer is a propylene copolymer, either random or block, of propylene derived units and at least one unit selected from ethylene and $C_4$ to $C_{20}$ alpha-olefin derived units, typically from ethylene and/or $C_4$ to $C_{10}$ alpha-olefin derived units, preferably butene, pentene, hexene, heptene, octene, nonene, decene, dodecene, 4-methyl-pentene-1,3-methyl pentene-1,3,5,5-trimethyl-hex-1-ene, and the like. In such embodiments, the propylene copolymer has at least one of the following properties: (i) an ethylene and/or $C_4$ to $C_{20}$ alpha-olefin derived unit content in the range of from about 0.1 wt. % to 50.0 wt. %, based on the weight of the copolymer, from 0.5 to 30 wt. %, from 1 to 15.0 wt. %, or from 0.1 to 5.0 wt. %; (ii) a Mw of from greater than 8,000 g/mol, greater than 10,000 g/mol, greater than 12,000 g/mol, greater than 20,000 g/mol; (iii) a Mw/Mn in the range of from 1.5 to 10, from 1.6 to 7, from 1.7 to 5, or from 1.8 to 4; and (iv) a MFR in the range of from about from 0.1 g/10 min to 2500 g/10 min, or from 0.3 to 500 g/10 min, as measured by ASTM D 1238, 230° C., 2.16 kg.

The procedure for measuring Tm is described as follows. Tm is measured using Differential Scanning calorimetry (DSC) using commercially available equipment such as a TA Instruments 2920 DSC. Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For polymers displaying multiple peaks, the melting point (or Tm) is defined to be the peak melting temperature (i.e., associated with the largest endothermic calorimetric response in that range of temperatures) from the DSC melting trace; likewise, the crystallization temperature (Tc) is defined to be the peak crystallization temperature (i.e., associated with the largest exothermic calorimetric response in that range of temperatures) from the DSC crystallization trace. Areas under the DSC curve are used to determine the heat of transition (Hf, upon melting or heat of crystallization, Hc, upon crystallization, if the Hf value from the melting is different from the Hf value obtained for the heat of crystallization, then the value from the melting (Tm) shall be used), which can be used to calculate the degree of crystallinity (also called the % crystallinity).

Techniques for determining the molecular weight (Mn, number average molecular weight, and Mw, weight average molecular weight) and molecular weight distribution (Mn/Mw) may be found in U.S. Pat. No. 4,540,753, which is incorporated by reference herein, and in Macromolecules 1988, 21, 3360, which is also incorporated by reference herein. Mw and Mn may be determined by size exclusion chromatography (SEC), e.g., 3D SEC, also referred to as GPC-3D. The Mw/Mn, also known as the molecular weight distribution, is the ratio of Mw to Mn.

Suitable polymers include at least one of a polypropylene, propylene-ethylene copolymer, propylene-butene copolymer, or propylene-ethylene-butylene terpolymer. Propylene-based polymers useful in layers A and B include those commercially available from ExxonMobil Chemical Company (Houston, Tex.) under the trade designations ACHIEVE™, EXXTRAL™, EXXONMOBIL™ random copolymers, or VISTAMAXX™; those available from Ineos Olefins and Polymers USA (League City, Tex.) under the trade designation INEOS KS333; and those commercially available from LyondellBasell Polymers (The Netherlands) under the trade designations ADSYL or CLYRELL. Polypropylene commercially available from Borealis Polymers (Vienna, Austria) and sold under the trade designation of HE 125M may also be used, as disclosed in EP 1 837 884.

Coatings

In embodiments herein, the film is coated with one or more layers, which may the same or different, by the application of coating liquids. In particular, the first side of layer A may be coated. In addition, the second side of layer B may also be coated. The coating liquids may include any of surfactants, binding agents, curing agents, pigments, optical brighteners, defoamers, cross-linking agents, rheological additives, and softeners. The coating liquids may be applied to the film surface by any means known in the art. The coating liquids may be applied to the film surface in any order known in the art to achieve the desired properties of the coated film, such as printability or adhesion.

In embodiments herein, the coating is printable. The printable coating may be any composition known in the art to be useful in retaining ink, dye, pigment, colorant and the like. In other embodiments, the printable coating is printed, thereby retaining ink, dye, pigment, or colorant, and the like. In other embodiments, the coating is a primer. In yet other embodiments, the coating is an adhesive primer.

Surfactants useful herein have a reducing effect on the dynamic surface tension of an aqueous system. In conventional coating processes, ionic and/or non-ionic surfactants are used. Non-ionic surfactants are, for example, glycols, polyglycols, or polyoxyalkylene glycols, such as, for example, $C_{11}$-oxo-alcohol polyglycol ether sold under the tradename GENAPOL UD050 (Clariant Technologies, Muttenz, Switzerland); ethoxylated and non-ethoxylated 2,4,7,9-tetramethyl-5-decyl-4,7-diols; oxiranes such as 2-methoxymethyloxirane, sold under the tradename DENACOL EX-821 (Shanghai Licheng Chemical Co., Shanghai, China), 1,4-dimethyl-1,4-bis(2-methyl-propyl)-2-butyl-1,4-diethyl-ether; 1,3-pentanediol, trimethylpentanediol; glycerine, t-octylphenoxypolyethoxyethanol sold under the tradename TRITON X100 (Dow Chemical, Freeport, Tex.), and terstol. Ionic surfactants are, for example, sodium salts of polyacrylic acids, quaternary alkyl ammonium salts (e.g., hexadecyltrimethylammonium chloride), betaines, or metal salts of fatty acids, aliphatic esters of dicarboxylic acids, and lauryl sulfates.

Pigments useful herein include chalk, kaolin, talcum; calcium carbonate such as precipitated calcium carbonate sold under the tradename MULTIFEX MM (Speciality Minerals, Inc., Bethlehem, Pa.), mica, titanium dioxide, ammonium zirconium carbonate such as sold under the tradename AZCOTE 5800M (Hopton Technologies Inc., Albany, Oreg.), silicic acid (silica) such as colloidal dioxosilane sold under the tradename LUDOX AS40 (Alfa Aesar, Ward Hill, Mass.) or aluminum oxide.

It is also possible to use additional coating fluids comprising styrene-butadiene, styrene-acrylate, acrylic emulsions such as those available under the tradename NEOCRYL XY90 (Neoresins, the Netherlands), vinyl acetate, vinyl acetate copolymers, functionalized copolymer dispersions such as those available under the tradename MICHEM® PRIME 4983R (Michelman Inc., Cincinnati, Ohio), nanoscale wax emulsions such as those available under the tradename MICHEM® LUBE ML215 (Michelman Inc.), acetoacetoxyethylmethacrylate such as those available under the tradename AAEM from Eastman Chemicals, Kingsport, Tenn.), crosslinked polymethylmethacrylate resin such as that available under the tradename EPOSTAR MA-1004 (Nippon Shokubai Chemicals, Kawasaki, Japan), polyethylene/wax microsized zirconia such as those available under the tradename ME09730 from Michelman Inc., antiblocking agents such as those available under the tradename TOSPEARL T120 (GE Silicones, Wilton, Conn.), curing agents such as those available under the tradename IMICURE EMI-24 (Air Products and Chemicals Inc, Allentown, Pa.), ethylene-oxide/propylene oxide copolymer such as those commercially available under the tradename TERGITOL 15S9 (Dow Chemical Company, Freeport, Tex.), an adhesion-promoting tie layer such as PRIMACOR™ ethylene-acrylic acid copolymers available from Dow Chemical Company, and/or ethylene-vinyl acetate copolymers, or polyurethane.

Layer C

In some embodiments, the multilayer polymeric film may comprise an additional layer C, where layer C may comprise, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper. Further, one or more C layers can be replaced with a substrate layer, such as glass, plastic, paper, metal, etc., or the entire film can be coated or laminated onto a substrate. Thus, the inventive multilayer polymeric films disclosed herein, can be coated onto a substrate such as paper, metal, glass, plastic and other materials capable of accepting a coating. Such coated structures and articles are also within the scope of the present invention.

Additives

Any of the layers described herein may comprise one or more additives. The layer may comprise additives in the range of from about 0.1 to about 10 wt. %, based on the total weight of the polymers comprising the layer. Preferred inorganic and organic additives include, for instance, other antistatic agents, ultraviolet light absorbers, plasticizers, pigments, dyes, antimicrobial agents, anti-blocking agents (such as anti-block MB), stabilizers, lubricants (e.g., slip agents, such as slip MB), processing aids, white pigments such as titanium oxide, zinc oxide, talc, calcium carbonate, etc., matte beads, compatibilizers, dispersants, for example, fatty amides such as stearamide, etc., hardeners, quaternary salts, metallic salts of fatty acids such as zinc stearate, magnesium stearate, etc., pigments and dyes, such as ultramarine blue, cobalt violet, etc., and fluorescent whiteners. Preferred additives include white pigments such as the titanium dioxide masterbatch formulations commercially available from Ampacet Corporation (Tarrytown, N.Y.), for example, under the trade designation AVK60.

Opaque Films

The films of the invention may be clear or opaque. In one embodiment, the film is opaque and comprises a cavitating agent. The cavitating agent may include a group of organic and inorganic materials including, for example, polybutylene teraphthalate ("PBT"), polyethylene terephthalate ("PET"), poly(ethylene 2,6-napthalate) ("PEN"), polycarbonate, polycarbonate alloy, nylon, cross-linked polystyrene, syndiotactic polystyrene, acetal, acrylic resins, polyacrylate, poly(N-vinylcarbozole), polyvinylcyclohexane, polyvinyl chloride, polyacrylonitrile, cyclic olefinic polymer, aliphatic polyketone, poly(4-methyl-1-pentene), ethylene vinyl alcohol copolymers, polysulfones, cross-linked polystyrene, cross-linked silicone polymers, solid or hollow pre-formed glass or polymer spheres, metal beads or spheres, ceramic spheres, calcium carbonate, talc, chalk, or combinations thereof. One cavitating agent is a cyclic olefinic polymer selected from a cyclic olefin homopolymer ("COH"), a cyclic olefin copolymer ("COC"), and blends thereof. COC is a copolymer comprising two monomers; one monomer being a cyclic olefin, such as a $C_4$ to $C_{12}$ cyclic olefin or norbornene, and the second monomer being an aliphatic olefin, such as ethylene, propylene, and butylene. The COC copolymer can be random, block, grafted, or any possible structure, having at least one co-monomer in the chain backbone. In some embodiments herein, the cavitating agent is PBT.

The cavitating agent can be added to any layer of the film. In some embodiments herein, the cavitating agent is added to layer B. The amount of the cavitating agent to be incorporated may correspond to the desired degree of void formation upon stretching. The film may comprise a cavitating agent or a blend of the cavitating agents in an amount of about 0.5 to about 70%, about 1.0 to about 60.0%, about 3.0 to about 60.0%, about 5.0 to about 50.0%, about 5.0 to about 30.0%, about 5.0 to about 20.0%, or about 5.0 to about 15.0%, based on the total weight of the layer to which the cavitating agent is added.

Film Formation

To make the multilayer films disclosed herein, any process that is known in the art can be used, such as film-blowing, tenter processes, and casting. The multilayer films may also be used in extrusion coating and thermoforming. In particular embodiments, the multilayer films disclosed herein may be made by conventional fabrication techniques, for example, simple bubble extrusion, biaxial orientation processes (such as tenter frames or double bubble processes), cast/sheet extrusion, coextrusion, lamination, etc. Conventional simple bubble extrusion processes (also known as hot blown film processes) are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Biaxial orientation film manufacturing processes, such as described in the "double bubble" process of U.S. Pat. No. 3,456,044 (Pahlke), and the processes described in U.S. Pat. No. 4,352,849 (Mueller), U.S. Pat. Nos. 4,820,557 and 4,837,084 (both to Warren), U.S. Pat. No. 4,865,902 (Golike et al.), U.S. Pat. No. 4,927,708 (Herran et al.), U.S. Pat. No. 4,952,451 (Mueller), and U.S. Pat. Nos. 4,963,419 and 5,059,481 (both to Lustig et al.), the disclosures of which are incorporated herein by reference, can also be used to make the novel film structures of this invention.

Advantageously, the layers of the inventive films may be formed directly during the (co)-extrusion step of the film forming process, thus eliminating the need to coat and dry a solvent-based antistatic layer, as has been the practice before. Preferably, the film is co-extruded, cast, oriented, and then prepared for its intended use such as by coating, printing, slitting, or other converting methods.

Typically, the film is formed by coextruding the layers together through a flat sheet extruder die at a temperature between about 200° C. to about 275° C., casting the film onto a cooling drum and quenching the film. The sheet is then stretched about 4 to about 6 times in the machine direction (MD) followed by stretching about 6 to about 10 times in the transverse direction (TD). The film is then wound onto a reel. Optionally, one of the external surfaces is flame or corona treated before winding.

In some embodiments, one or more layer may be modified by corona treatment, electron beam irradiation, gamma irradiation, or microwave irradiation. In a preferred embodiment one or both of the surface layers of a particular layer is modified by corona treatment, which includes exposing the film surface to a high voltage corona discharge while passing the film between a pair of spaced electrodes. In particular, corona treatment may produce a significant difference in the kinetic coefficient of friction of the two surface layers. The surface of the layer may be treated during or after orientation. After electronic treatment of the film surface, a coating may then be applied thereto.

The multilayered film may also comprise additional coatings and/or layers capable of accepting another layer. For example, as used herein, an adhesive primer is a layer that is capable of accepting an adhesive coating. Other types of coatings that find utility in the multilayer films of the present invention include printable or printed coatings, sealable coatings, and coatings that reduce the coefficient of friction.

The layer B (or layer) usually represents about 70.0 to about 90.0% of the thickness of the total multilayer film. The skin layers are usually coextensively applied to each surface of the layer B, typically by coextrusion, as noted above. Consequently, the first or second layers may not, ultimately, be the outermost layers.

More specifically, embodiments herein disclose a method for making a printable multilayer polymeric film comprising: (a) forming a layer A, comprising one or more polyolefins, having a first side and a second side; (b) forming a layer B, comprising one or more polyolefins, having a first side and a second side; (c) forming a film comprising layer A and layer B, wherein layer B is on the second side of layer A; (d) coating layer A with a printable coating; and wherein at least one of layers A and B comprises 0.01 to 50.0 wt. % of at least one polyether-polyolefin block copolymer, based on the weight of the polymers comprising the layer; wherein the multilayer printable polymeric film has a kinetic coefficient of friction less than 0.65; and a surface tension of greater than 35 mN/m on one or both sides.

In some embodiments, the layers are co-extruded to form the printable multilayer polymeric film.

In some embodiments, the forming of layer A and/or B further comprises mixing: (a) at least one polyolefin; and (b) the polyether-polyolefin block copolymer; wherein the polyether polyolefin copolymer is provided as a blend of: (i) 5.0 to 50.0 wt. % of at least one polyether-polyolefin block copolymer; (ii) 50.0 to 95.0 wt. % of at least one propylene-based polymer, based on the combined weights of (i) and (ii); and (iii) optionally, an antioxidant.

In some embodiments, the polyether-polyolefin block copolymer is a non-migratory antistatic agent.

In some embodiments, the method further comprises coating a side of the film with a primer and/or an adhesive primer.

Yet other embodiments relate to a method for making multilayer printable polymeric films comprising: (a) forming a layer A, comprising one or more polyolefins, having a first side and a second side; (b) forming a layer B, comprising one or more polyolefins, having a first side and a second side; (c) forming a film comprising layer A and layer B wherein the first side of layer B is on the second side of layer A, preferably the layers are co-extruded to form the printable multilayer polymeric film, preferably the film is oriented; (d) coating layer A with a printable coating; and (e) optionally, coating the second side of layer B, preferably the coating is an adhesive primer; wherein at least one of layers A and B comprises 0.01 to 50.0 wt. % of a polyether-polyolefin block copolymer, based on the weight of the polymers comprising the layer, preferably about 5.0 wt. % to about 40.0 wt. %, or preferably about 5.0 wt. % to about 35.0 wt. %, preferably layer A comprises the polyether-polyolefin copolymer; wherein the multilayer printable polymeric film has a kinetic coefficient of friction of less than 0.65, less than 0.55, or less than 0.45; and a surface tension of greater than about 35 mM/m, greater than about 40 mM/m, greater than about 50 mN/m, or greater than 55 mN/m on one or both sides.

Even other embodiments relate to the method where the forming of layer A and/or layer B further comprises mixing: (a) at least one polyolefin; preferably propylene-based polymer; and (b) the polyether-polyolefin block copolymer; wherein the polyether-polyolefin copolymer is a non-migratory antistatic agent and is provided as a blend of: (i) 5.0 to 50.0 wt. % of at least one polyether-polyolefin block copolymer; (ii) 50 to 95.0 wt. % of at least one propylene-based polymer, based on the combined weights of (i) and (ii); and optionally, at least one antioxidant, preferably two or more, or preferably three or more, and preferably the antioxidant comprises 0.05 to about 2 wt. % of the blend, based on the weight of (i) and (ii), preferably from about 0.5 to about 1.5 wt. %, or from about 0.75 to about 1 wt. %.

Other embodiments herein relate to a printable article comprising a multilayer polymeric film having: (a) at least one layer A, comprising one or more polyolefins, having a first side and a second side; (b) a layer B, comprising one or more polyolefins, having a first side and a second side, where the first side of B is located on the second side of layer A; (c) a printable coating located on the first side of layer A; wherein at least one of layer A or B comprises 0.01 to 50.0 wt. % of at least one polyether-polyolefin block copolymer, based on the weight of the polymers comprising the layer; wherein the multilayer printable polymeric film has a kinetic coefficient of friction less than 0.65; and a surface tension of greater than about 35 mN/m on one or both sides.

Some embodiments herein relate to the printable article, where the polyether-polyolefin block copolymer is a non-migratory antistatic agent provided as a blend of: (i) 5.0 to 50.0 wt. % of at least one polyether-polyolefin block copolymer; (ii) 50.0 to 95.0 wt. % of at least one propylene-based polymer, based on the combined weights of (i) and (ii); and (iii) optionally, an antioxidant. In such embodiments, the blend has a melt flow index in the range of from about 0.5 to about 100.0 g/10 min, preferably in the range of from about 2 to about 75 g/10 min.

Some embodiments herein relate to the printable article, where the printable coating is printed. Other embodiments relate to the printable article, wherein the article is a printed or printable label. Other embodiments relate to the use of the composition of the printable multilayer polymeric film, or as made by the methods of making a printable multilayer polymeric film, as a label or a bag; preferably as a printed label or a printed bag.

Film Properties and Test Methods

The films made from the compositions of the present invention have a new and useful combination of properties that allow them to be used as films for label applications with better antistatic performance.

Films herein have one or more of the following optical, surface, and antistatic properties: (i) a gloss 45° of greater than 56, greater than 58, or greater than 60, as measured by ASTM D 2457; (ii) a light transmission of greater than 22%, greater than 25%, or greater than 35%, as measured by ASTM D 1003; (iii) a whiteness in the range of from about 70 to 90%, from about 75 to about 90%, or from about 85 to about 90%, as measured by ASTM E 313; (iv) a kinetic coefficient of friction for the layer A side of the film in the range of from about 0.30 to 0.70, from about 0.35 to about 0.65, or from about 0.35 to about 0.50, as measured by ASTM D1894; (v) a surface tension for the layer A side of the film greater about 31 mN/m, greater than 35 mN/m, or greater than 50 mN/m, as measured by ASTM D 2578; (vi) a 90% static decay of about 800 milliseconds or less, about 500 milliseconds or less, or about 350 milliseconds or less, measured using ASTM D 257; and (vii) a surface resistivity in the range of from about $10^6$ to about $10^{12}$ ohms/square, from about $10^8$ to about $10^{12}$ ohms/square, or from about $10^{10}$ to about $10^{12}$ ohms/square, measured at 47% RH and 21.5° C., using ASTM D 257.

Optical Properties

Good gloss, light transmission (LT), and whiteness are desirable optical properties in multilayer polymer films, especially those used in label applications. Multilayer films disclosed herein demonstrate comparative or improved optical properties, as compared to a reference film.

Gloss provides information about the shininess or gloss of the film. Gloss measurement involves specular reflection, which is a sharp light beam reflecting from the film surface, at a specific angle of incidence, herein 45°. Gloss usually varies as a function of surface smoothness and flatness. For the purposes of the claims herein, gloss 45° of the multilayer polymeric films is determined as per ASTM D 2457. The inventive films have comparative gloss to the reference films as disclosed herein in Table 3. In embodiments herein, the inventive films have a gloss 45° of greater than 56, greater than 58, or greater than 60.

LT is the percentage of incident light that passes through a film. For the purposes of the claims herein, LT is determined as per ASTM D 1003, using a spectrophotometer. The inventive films have comparative LT to the reference films as disclosed in Table 3. In embodiments herein, the inventive films have a LT of greater than 22%, greater than 25%, or greater than 35%.

Whiteness an index of how white a sample is, and is psychophysically estimated for the purposes of the claims herein, using procedures outlined in ASTM E 313. The inventive films have comparative whiteness to the reference films as disclosed in Table 3. In embodiments herein, the inventive films have a whiteness greater than 70%, greater than 75%, greater than 85%, or greater than 90%. In other embodiments, the whiteness is in the range of from about 70 to about 90%, from about 75 to about 90%, or from about 85 to about 90%.

Surface Properties

Surface properties of the multilayer polymeric films disclosed herein include surface tension and kinetic coefficient of friction.

Kinetic coefficient of friction is related to the slip properties of films, and is determined for the purposes of the claims herein, using ASTM D 1894, using a stationary sled with a moving plane at 23° C. The inventive films have comparative kinetic coefficient of friction to the reference film as disclosed in Table 3. In embodiments herein, the inventive films have a kinetic coefficient of friction for the layer A side of the film in the range of from about 0.30 to 0.65, from about 0.35 to about 0.65, or from about 0.35 to about 0.50.

Surface tension is an indicator of the wettability of the surface and its ability to accept and retain inks, coatings, adhesives, etc., and is measured for the purposes of the claims herein, by ASTM D 2578. The inventive films have greater surface tension as compared to the reference film, as disclosed in Table 3. In embodiments herein, the inventive films have a surface tension for the layer A side of the film greater about 31 mN/m, greater than 35 mN/m, or greater than 50 mN/m.

Antistatic Properties

Antistatic properties of the multilayer polymeric films disclosed herein include maximum charge after cycling, residual charge after 300 s decay time, 50% static decay time, 90% static decay time, and surface resistivity, which are measured for the purposes of the claims herein, using ASTM D 257, using a guard circuit equipped with a guard electrode.

The multilayer polymeric films have an improved 90% static decay when compared to the reference film, as shown in Table 4. The inventive films have a 90% static decay of about 800 milliseconds or less, about 500 milliseconds or less, or about 350 milliseconds or less.

Surface resistivity is a measure of a sample's inherent resistance to a flow of electrical current and is measured by ASTM D 257. The inventive films have improved surface resistivity compared to the reference film, as disclosed in Table 4. The inventive films have a surface resistivity of less than $10^{12}$ ohms/square, measured at 47% RH and 21.5° C., preferably in the range of from about $10^6$ to about $10^{12}$ ohms/square, preferably in the range of about $10^8$ to about $10^{12}$ ohms/square; or preferably in the range of $10^8$ to about $10^{10}$ ohms/square.

In other embodiments, this invention relates to:

1. A multilayer printable polymeric film comprising:

(a) at least one layer A having a first side and a second side, preferably layer A comprises non-conductive polymers, preferably layer A comprises polyolefins, preferably layer A comprises at least one propylene-based polymer;

(b) a layer B, having a first side and a second side, where the first side of B is located on the second side of layer A, preferably layer B comprises non-conductive polymers, preferably layer B comprises polyolefins, preferably layer B comprises at least one propylene-based polymer; and (c) a printable coating located on the first side of layer A, preferably the coating is printed;

wherein at least one of layer A and B comprises 0.01 to 50.0 wt. %, preferably about 5.0 wt. % to about 40.0 wt. %, or preferably about 5.0 wt. % to about 35.0 wt. %, of at least one polyether-polyolefin block copolymer, based on weight of the polymers comprising the layer, preferably layer A comprises the polyether-polyolefin copolymer;

wherein the multilayer printable polymeric film has a kinetic coefficient of friction of less than 0.65, less than 0.55, or less than 0.45; and a surface tension of greater than about 35 mM/m, greater than about 40 mM/m, greater than about 50 mN/m, or greater than 55 mN/m; on one or both sides; preferably side A of the film.

2. The multilayer printable polymeric film of paragraph 1, wherein the polyether-polyolefin block copolymer is a non-migratory antistatic agent, preferably the polyether-polyolefin block copolymer is provided as a blend of: (i) 5.0 to 100 wt. % of at least one polyether-polyolefin block copolymer based on the weight of the polymers in the non-migratory antistatic agent, preferably 10 to 90 wt. %, preferably 25.0 to 80 wt. %, or preferably 5.0 to 50.0 wt. %; (ii) 50 to 95.0 wt. % of at least one propylene-based polymer, preferably 65.0 to 95.0 wt. %, or from about 75.0 to about 95.0 wt. %, based on the combined weights of (i) and (ii); and (iii) optionally, at least one antioxidant.

3. The multilayer printable polymeric film of paragraphs 1 and 2, having a surface resistivity of less than $10^{12}$ ohms/square, measured at 47% RH and 21.5° C., preferably in the range of from about $10^6$ to about $10^{12}$ ohms/square, preferably in the range of about $10^8$ to about $10^{12}$ ohms/square, or preferably in the range of $10^8$ to about $10^{10}$ ohms/square.

4. The multilayer printable polymeric film of paragraphs 1 to 3, having a 90% static decay time of about 800 milliseconds or less, preferably about 500 milliseconds or less, or preferably 350 milliseconds or less.

5. The multilayer printable polymeric film of paragraphs 2 to 4, wherein the blend has a melt flow index in the range of from about 0.5 to about 100 g/10 min, preferably in the range of from about 2 to about 75 g/10 min.

6. The multilayer printable polymeric film of paragraphs 1 to 5, further comprising a coating on the second side of layer B, preferably the coating is an adhesive primer.

7. The multilayer printable polymeric film of paragraphs 1 to 6, having a whiteness greater than 70%, greater than 75%, greater than 85%, or greater than 90%.

8. The multilayer printable polymeric film of paragraphs 1 to 7, having a gloss 45° of greater than 56, greater than 58, or greater than 60.

9. The multilayer printable polymeric film of paragraphs 1 to 8, having a light transmission of greater than 22%, greater than 25%, or greater than 35%.

10. A method for making the multilayer printable polymeric films of paragraphs 1 to 9 comprising:

(a) forming a layer A, comprising one or more polyolefins, having a first side and a second side;

(b) forming a layer B, comprising one or more polyolefins, having a first side and a second side;

(c) forming a film comprising layer A and layer B wherein the first side of layer B is on the second side of layer A; preferably the layers are co-extruded to form the printable multilayer polymeric film; preferably the film is oriented;

(d) coating the first side of layer A with a printable coating; and (e) optionally, coating the second side of layer B; preferably the coating is an adhesive primer;

wherein at least one of layers A and B comprises 0.01 to 50.0 wt. % of a polyether-polyolefin block copolymer, based on the weight of the polymers comprising the layer, preferably about 5.0 wt. % to about 40.0 wt. %, or preferably about 5.0 wt. % to about 35.0 wt. %, preferably layer A comprises the polyether-polyolefin copolymer;

wherein the multilayer printable polymeric film has a kinetic coefficient of friction of less than 0.65, less than 0.55, or less than 0.45, and a surface tension of greater than about 35 mM/m, greater than about 40 mM/m, greater than about 50 mN/m, or greater than 55 mN/m; on one or both sides; preferably on side A of the film.

11. The method of paragraph 10, wherein the forming of layer A and/or layer B further comprises mixing:

(a) at least one polyolefin; preferably propylene-based polymer;

(b) the polyether-polyolefin block copolymer;

wherein the polyether-polyolefin copolymer is a non-migratory antistatic agent and is provided as a blend of:

(i) 5.0 to 50 wt. % of at least one polyether-polyolefin block copolymer;

(ii) 50 to 95.0 wt. % of at least one propylene-based polymer, based on the combined weights of (i) and (ii); and (iii) optionally, at least one antioxidant, preferably two or more, or preferably three or more, and preferably the antioxidant comprises 0.05 to about 2 wt. % of the blend, based on the weight of (i) and (ii), preferably from about 0.5 to about 1.5 wt. %, or from about 0.75 to about 1 wt. %.

12. A printable article comprising the printable multilayer polymeric film of paragraphs 1 to 9 or the film made by paragraphs 10 to 11, preferably the printable article is a label.

13. The printable article of paragraph 12, wherein the printable coating is printed, preferably the article is a printed label.

14. The use of the composition of paragraphs 1 to 9, or as made by the methods of paragraphs 10 to 11, as a label or a bag, preferably as a printed label or a printed bag.

15. In particular films, methods, and uses of paragraphs 1 to 14, the kinetic coefficient of friction and surface tension are the kinetic coefficient of friction and surface tension of the surface of the printable coating located on the first side of layer A.

EXAMPLES

The new and useful combination of properties of the films described herein will now be further illustrated with reference to the following examples. The various properties, as determined by the test methods above, were measured with respect to a reference five layer polymeric film, each layer comprising propylene-based polymers.

The various properties, as determined by the test methods above, were also measured with respect to inventive five layer polymeric films, the outer skin layer comprising a non-migratory antistatic agent. Four inventive films were produced, three of which had a different non-migratory antistatic agent in the skin layer, and one which had a non-migratory antistatic resin in the tie layer. The films were stored for a year, treated, coated, and then tested, as shown below. The overall thickness of the coated film was about 50 μm. The thickness distribution was varied, as noted in Table 4 below.

Table 1 provides a listing of component materials used in the inventive films. The reference film has the same composition, but does not have a non-migratory antistatic agent in any layer.

TABLE 1

| Composition of Films 1 to 11 | | |
| --- | --- | --- |
| Layer | Brief Description | Tradename |
| Coating | Pressure sensitive adhesive label facestock | ExxonMobil PSA-4 |
| Layer A—Outer Skin (0.75 μm) | Non-migratory antistatic agent | PRE-ELEC ® ESD 5060 PRE-ELEC ® ESD 5050 PRE-ELEC ® TP 11222 |
| | ethylene-propylene-butene terpolymer | Eltex ® P KS333N8061 |
| Layer B—Tie 1 (3.0 μm) | 94% polypropylene homopolymer + 6% TiO$_2$ masterbatch | Total PPH4030 + AMPACET AVK60 |
| Layer B—Core | 10% recycled cavitated white label | Recycled from internal sources |
| | 5.2% GE 3103 | PBT |
| | 44.8% polypropylene homopolymer | Total PPH4030 |
| | 40% polypropylene homopolymer | Total PPH40306 |
| Layer B—Tie 2 (3.0 μm) | 94% polypropylene homopolymer + 6% TiO$_2$ masterbatch | Total PPH4030 + AMPACET AVK60 |
| Layer A—Inner Skin (0.75 μm) | Ethylene-propylene-butene terpolymer + syloblock | Eltex ® P KS333N8061 |

The films in the following experiments are five layer base films with two polypropylene-based skin layers. The outer skin layer of the inventive films 1 to 11 comprises the non-migratory antistatic agent. Table 2 shows the non-migratory antistatic agent composition of the films. Films 1 to 6 comprise a non-migratory antistatic agent comprising a polypropylene terpolymer. Films 7 to 11 comprise a non-migratory antistatic agent comprising a propylene homopolymer. Films 3 and 4 comprise both migratory and non-migratory antistatic agents.

TABLE 2

FILM COMPOSITIONS

| FILM | Non-Migratory Antistatic Agent, Commercial Source | Compatibilizer polymer type | MFI (g/10 min) | Comments |
|---|---|---|---|---|
| Film 1 | PRE-ELEC ® ESD 5050, Premix Oy | Polypropylene terpolymer | 11 | No corona treatment |
| Film 2 | PRE-ELEC ® ESD 5050, Premix Oy | Polypropylene terpolymer | 11 | Corona treated, both sides |
| Film 3 | PRE-ELEC ® ESD 5050, Premix Oy | Polypropylene terpolymer | 11 | ARMOSTAT 475 in tie layer; No corona treatment |
| Film 4 | PRE-ELEC ® ESD 5050, Premix Oy | Polypropylene terpolymer | 11 | ARMOSTAT 475 in tie layer; corona treated, both sides |
| Film 5 | PRE-ELEC ® TP 11222, Premix Oy | Polypropylene terpolymer | 13 | No corona treatment |
| Film 6 | PRE-ELEC ® TP 11222, Premix Oy | Polypropylene terpolymer | 13 | Corona treated, both sides |
| Film 7 | PRE-ELEC ® ESD 5060, Premix Oy | Propylene homopolymer | 7 | No corona treatment |
| Film 8 | PRE-ELEC ® ESD 5060, Premix Oy | Propylene homopolymer | 7 | Corona treated, both sides |
| Film 9 | PRE-ELEC ® ESD 5060, Premix Oy | Propylene homopolymer | 7 | Corona treated, both sides |
| Film 10 | PRE-ELEC ® ESD 5060, Premix Oy | Propylene homopolymer | 7 | PRE-ELEC ® ESD 5060 in the tie layer; corona treated, both sides |
| Film 11 | PRE-ELEC ® ESD 5060, Premix Oy | Propylene homopolymer | 7 | PRE-ELEC ® ESD 5060 in the tie layer; no corona treatment |

Example 1

Printable Coating on Skin Layer Comprising Non-Migratory Antistatic Agent

In Example 1, the skin layers of the inventive films 1 to 11 comprising the non-migratory antistatic agent were coated with the printable coating to produce coated films 1-1 to 11-1. This side of the film to which the printable coating was applied is designated side P. The printable coating was deposited to a thickness of 0.15 g/msi. A primer coating (0.125 g/msi) and thereafter an adhesive primer coating (0.278 g/msi) were applied to the other side of the film, designated here as side A. Table 3 shows the composition of each of the printable coating, the primer coating, and the adhesive primer coating.

TABLE 3

COMPOSITIONS OF COATINGS

| Coating | Order of Addition | Commercial Source | Comments | % SOLIDS | Parts per hundred of polymer (phr) |
|---|---|---|---|---|---|
| Primer | Darex Binder Additive[1] | Obtained from W. R. Grace (Cambridge, MA) | Self-crosslinking cationic acrylic binder | 100 | — |
| | TERGITOL 15S9 | Dow Chemical Co. (Freeport, TX) | Ethylene-oxide/propylene oxide copolymer | 0.4 | — |
| | DENACOL EX-821 | Shanghai Licheng Chemical Co. (Shanghai, China) | 2-(methoxymethyl)oxirane | 8 | — |
| | TOSPEARL T120 | GE Silicones (Wilton, CT) | Silicone-based antiblocking agent | 0.25 | — |
| | EPOSTAR MA-1004 | Nippon Shokubai Chemicals (Kawasaki, Japan) | Crosslinked polymethylmethacrylate resin | 0.075 | — |
| | GENAPOL UD050 | Clariant Technologies (Muttenz, Switzerland) | $C_{11}$-Oxo-alcohol polyglycol ether surfactant | 0.70 | — |
| | LUDOX CL-P | Alfa Aesar (Ward Hill, MA) | Colloidal dioxosilane | 27.6 | — |
| | ME09730 Wax | Michelman (Cincinnati, OH) | polyethylene/wax-microsized zirconia | 0 | — |
| Adhesive Primer | GENAPOL UD050 | Clariant Technologies, (Muttenz, Switzerland) | $C_{11}$-Oxo-alcohol polyglycol ether surfactant | 100 | 0.6 |

TABLE 3-continued

COMPOSITIONS OF COATINGS

| Coating | Order of Addition | Commercial Source | Comments | % SOLIDS | Parts per hundred of polymer (phr) |
|---|---|---|---|---|---|
| | MULTIFEX MM | Speciality Minerals, Inc. (Bethlehem, PA) | Precipitated calcium carbonate | 100 | 3 |
| | AZCOTE 5800M | Hopton Technologies, Inc. (Albany, OR) | Ammonium zirconium carbonate; crosslinking agent | 32 | 15.6 |
| | LUDOX AS40 | Alfa Aesar (Ward Hill, MA) | Colloidal dioxosilane | 40 | 38 |
| | MICHEM ® LUBE ML215 | Michelman Inc. (Cincinnati, OH) | Nanoscale wax emulsion | 20 | 6 |
| | MICHEM ® PRIME 4983.15 | Michelman Inc. (Cincinnati, OH) | Functionalized copolymer dispersion | 25 | 100 |
| | NEOCRYL XK90 | DSM NeoResins (Waalwijk, The Netherlands) | acrylic emulsion | 45 | 70 |
| Printable Coating | IMICURE EMI-24 | Air Products and Chemicals, Inc. (Allentown, PA) | 2-Ethyl-4-methyl imidazole; curing agent | 100 | 1 |
| | Acetic Acid | Alfa Aesar (Ward Hill, MA) | | 100 | 0.43 |
| | GENAPOL UD050 | Clariant Technologies (Muttenz, Switzerland) | $C_{11}$-Oxo-alcohol polyglycol ether surfactant | 100 | 0.7 |
| | TOSPEARL T120 | GE Silicones (Wilton, CT) | Silicone-based antiblocking agent | 100 | 0.25 |
| | EPOSTAR MA-1004 | Nippon Shokubai Chemicals (Kawasaki, Japan) | Crosslinked polymethylmethacrylate resin | 100 | 0.075 |
| | Darex Binder Additive[1] | Obtained from W. R. Grace (Cambridge, MA) | Self-crosslinking cationic acrylic binder | 37 | 100 |
| | DENACOL EX-821 | Shanghai Licheng Chemical Co., (Shanghai, China) | 2-(methoxymethyl) oxirane | 100 | 8 |
| | TERGITOL 15S9 | Dow Chemical Co., (Freeport, TX) | Ethylene-oxide/propylene oxide copolymer | 100 | 3 |
| | ME09730 Wax | Michelman (Cincinnati, OH) | polyethylene/wax-microsized zirconia | 30 | 1.1 |
| | AAEM | Eastman Chemicals (Kingsport, TN) | Acetoacetoxyethyl methacrylate | 100 | 5 |

[1]As described in U.S. Pat. No. 6,596,379.

Tables 4A and 4B show some film properties of the reference film compared to the coated inventive films 1-1 to 11-1. As above, films 1 to 6 comprise a non-migratory antistatic agent comprising a polypropylene terpolymer; and films 7 to 11 comprise a non-migratory antistatic agent comprising a propylene homopolymer. Gloss, whiteness, and kinetic coefficient of friction are measured on either surface of the film. Side "O" indicates the outer surface of the film, that is, nearest to layer A comprising the non-migratory agent, and side "I" is the other (inner) side of the film, furthest away from layer A.

TABLE 4A

FILM PROPERTIES I

| | Optical | | | | Surface Tension | | Physical | | Kinetic COF | |
|---|---|---|---|---|---|---|---|---|---|---|
| | Gloss I | Gloss O | LT | WI | I | O | Overall Thickness | Yield | I | O |
| Property | 0-100 | 0-100 | % | O | mN/m | mN/m | μm | m²/kg | | |
| Reference | 56.6 | 58.8 | 22.3 | 89.9 | 36 | <31 | 67 | 22.5 | 0.58 | 0.49 |
| Film 1-1 | 60.0 | 52.3 | 25.1 | 89.2 | 42 | 36 | 66 | 22 | 0.59 | 0.49 |
| Film 2-1 | 58.8 | 55.0 | 22.8 | 88.4 | 42 | >56 | 67 | 22.2 | 0.58 | 0.38 |
| Film 3-1 | 60.8 | 56.8 | 24.5 | 87.3 | 42 | 34 | 65 | 23.1 | 0.55 | 0.40 |
| Film 4-1 | 61.5 | 60.6 | 24.2 | 85.7 | 42 | >56 | 65 | 22.9 | 0.54 | 0.38 |
| Film 5-1 | 58.5 | 53.3 | 26.0 | 88.1 | 42 | 36 | 65 | 22.1 | 0.65 | 0.52 |

TABLE 4A-continued

FILM PROPERTIES I

| | Optical | | | | Surface Tension | | Physical | | Kinetic COF | |
|---|---|---|---|---|---|---|---|---|---|---|
| | Gloss I | Gloss O | LT | WI | I | O | Overall Thickness | Yield | I | O |
| Property | 0-100 | 0-100 | % | O | mN/m | mN/m | μm | m²/kg | | |
| Film 6-1 | 58.1 | 53.5 | 26.9 | 87.1 | 42 | >56 | 63 | 22 | 0.61 | 0.40 |
| Film 7-1 | 59.1 | 22.7 | 24.9 | 87.8 | 41 | 34 | 65 | 22.9 | 0.61 | 0.48 |
| Film 8-1 | 59.4 | 23.8 | 24.3 | 88.1 | 41 | >56 | 63 | 23.3 | 0.60 | 0.44 |
| Film 9-1 | 58.9 | 22.4 | 24.1 | 88.3 | 42 | 36 | 63 | 23.4 | 0.63 | 0.45 |
| Film 10-1 | 59.2 | 57.0 | 36.2 | 71.0 | 41 | 42 | 43 | 29.6 | 0.62 | 0.64 |
| Film 11-1 | 56.8 | 51.2 | 36.8 | 72.7 | 40 | <31 | 45 | 27.8 | 0.60 | 0.56 |

KEY:
LT = Light transmission;
WI = whiteness;
COF = coefficient of friction;
Yield is a measure of how much area is available per mass of film.

Table 4 shows that the average gloss for side A (no non-migratory antistatic agent) is 60% and the average gloss for side B (non-migratory antistatic agent) is 55 to 60% for films 1-1 to 6-1 (non-migratory antistatic agent comprises a propylene terpolymer) and 23% for films 7-1 to 11-1 (non-migratory antistatic agent comprises propylene homopolymer).

Table 4 also shows that light transmission is higher than that of the reference film by 2 to 3%, with an average LT of 25% for films 1 to 9. Films 10-1 and 11-1 have the $TiO_2$-containing tie layer replaced by the non-migratory antistatic agent. Accordingly, for films 10-1 and 11-1, the LT is higher by about 10% than the reference film.

Table 4 further shows that whiteness is stable at 86 to 89% for films 1-1 to 9-1. For films 10-1 and 11-1 in which the $TiO_2$ in the tie layer was replaced by the non-migratory antistatic agent, whiteness dropped to 71 to 72%.

Even further, the average kinetic kinetic coefficient of friction for films 1-1 to 9-1, which have the non-migratory antistatic layer in the skin layer, is 0.44, which is comparable to that of the reference film.

TABLE 4B

FILM PROPERTIES II

| | Static Charge Decay | | | | Surface Resistivity |
|---|---|---|---|---|---|
| | Max. Charge After Cycling | Residual Charge After 300 s Decay Time | 50% Decay Time | 90% Decay Time | 47% RH, 21.5° C. |
| Property | V | V | ms | ms | $Log_{10}$ ohms/square |
| Reference | −3,745 | −3,701 | >300,000 | >300,000 | >16.88 |
| Film 1 | −43 | −13 | 148 | 248 | 10.58 |
| Film 2 | −157 | −16 | 150 | 262 | 10.58 |
| Film 3 | −91 | −19 | 153 | 248 | 10.48 |
| Film 4 | −25 | −18 | 131 | 168 | 10.35 |
| Film 5 | −171 | −12 | 143 | 278 | 10.58 |
| Film 6 | −68 | −14 | 129 | 211 | 11.35 |
| Film 7 | −696 | −14 | 213 | 753 | 11.07 |
| Film 8 | −495 | −14 | 209 | 611 | 10.98 |
| Film 9 | −731 | −15 | 208 | 798 | 11.07 |
| Film 10 | −176 | −15 | 143 | 318 | 10.63 |
| Film 11 | −32 | −13 | 142 | 222 | 10.62 |

Table 4B shows that the residual charge of films 1-1 to 11-1 is very low (less than 20 V) compared to the reference film. Indeed, such low charges may be considered noise of the measuring equipment.

Table 4B also shows that the discharge (or decay time) of films 1-1 to 11-1 is very fast, in the order of milliseconds.

Table 4B further shows that the surface resistivity is decreased by 5 to 6 logarithmic units by using a non-migratory agent in the skin or tie layer.

Heat pressure sealing tests were performed on the inventive films 1-1 to 11-1. The films were sealed on the P/A interface and the P/P interface. The results are presented below in Table 4C.

TABLE 4C

FILM PROPERTIES III

| | | Seal Force (g) Sealing Temperature (° C.) | | | | | | | | |
|---|---|---|---|---|---|---|---|---|---|---|
| FILM | SEAL INTERFACE | 85 | 95 | 100 | 105 | 110 | 115 | 120 | 130 | 140 |
| Reference | P/A | 0 | 0 | 0 | 0 | 0 | 27 | 944 | 831 | 722 |
| | P/P | 0 | 0 | 0 | 0 | 0 | 59 | 1180 | 783 | 739 |
| 1-1 | P/A | 0 | 0 | 0 | 0 | 0 | 211 | 542 | 548 | 464 |
| | P/P | 0 | 0 | 0 | 0 | 0 | 179 | 739 | 739 | 691 |
| 2-1 | P/A | 0 | 0 | 0 | 0 | 0 | 13 | 375 | 338 | 350 |
| | P/P | 0 | 0 | 0 | 0 | 0 | 0 | 295 | 466 | 526 |
| 3-1 | P/A | 0 | 0 | 0 | 0 | 0 | 61 | 441 | 475 | 518 |
| | P/P | 0 | 0 | 0 | 0 | 0 | 0 | 596 | 709 | 738 |
| 4-1 | P/A | 0 | 0 | 0 | 0 | 0 | 0 | 596 | 709 | 738 |
| | P/P | 0 | 0 | 0 | 0 | 0 | 0 | 325 | 549 | 569 |
| 5-1 | P/A | 0 | 0 | 0 | 0 | 0 | 0 | 383 | 366 | 404 |
| | P/P | 0 | 0 | 0 | 0 | 0 | 0 | 415 | 672 | 1223 |
| 6-1 | P/A | 0 | 0 | 0 | 0 | 0 | 0 | 271 | 347 | 328 |
| | P/P | 0 | 0 | 0 | 0 | 0 | 0 | 149 | 446 | 527 |
| 10-1 | P/A | 0 | 0 | 0 | 0 | 0 | 0 | 311 | 499 | 565 |
| | P/P | 0 | 0 | 0 | 0 | 0 | 0 | 272 | 562 | 577 |
| 11-1 | P/A | 0 | 0 | 0 | 0 | 0 | 0 | 140 | 571 | 520 |
| | P/P | 0 | 0 | 0 | 0 | 0 | 0 | 221 | 617 | 562 |

Example 2

Adhesive Primer Coating and Primer Coating on Skin Layer Comprising Non-Migratory Antistatic Agent In Example 2, the skin layers of the inventive films 1, 5, and 7 comprising the non-migratory antistatic agent, were coated with a primer coating (0.125 g/msi) and thereafter an adhesive primer coating (0.278 g/msi), designated here as side A, to produce coated films 1-2, 5-2, and 7-2. The thickness of the coating of the skin layer comprising the non-migratory antistatic agent is greater than in Example 1. The printable coating was applied to the other side of the film, designated side P. The printable coating was deposited to a thickness of 0.15 g/msi. Table 5 shows the antistatic properties of each side of these coated films.

TABLE 5

ANTISTATIC PROPERTIES OF FILMS 1-2, 5-2, AND 7-2

| | Surface Resistivity (47% RH, 21.5° C.)/$\text{Log}_{10}$ ohms/square | |
|---|---|---|
| FILM | A | P |
| 1-2 | 16.25 | 10.79 |
| 5-2 | Discharge | 11.40 |
| 7-2 | 15.30 | 10.69 |

Films 1-2 and 7-2 demonstrated good antistatic properties, even through a coating layer thickness of 0.403 g/msi.

Prophetic Examples

The various properties, will be determined by the test methods above, and will be measured with respect to a reference multilayer polymeric film, having five layers, each layer comprising propylene-based polymers. The various properties, will be determined by the test methods above, will be also measured with respect to inventive multilayer polymeric films 12 to 19, having five layers, each layer comprising propylene-based polymers, and one layer comprising a non-migratory antistatic agent, both coated and non-coated.

Table 6 shows the prophetic compositions of films 12 to 19.

TABLE 6

Component Materials Used In Films 12 to 19

| Layer | Brief Description | Tradename |
|---|---|---|
| Coating | Pressure sensitive adhesive label facestock | ExxonMobil PSA-4 |
| Layer A—Outer Skin (0.75 μm) | Ethylene-propylene-butene terpolymer | Eltex ® P KS333N8061 |
| Layer B—Tie 1 (3.0 μm) | 94% polypropylene homopolymer + 6% TiO$_2$ masterbatch | Total PPH4030 + AMPACET AVK60 |
| Layer B—Core | 10% recycled cavitated white label | Recycled from internal sources |
| | 5.2% GE 3103 | PBT |
| | 44.8% polypropylene homopolymer | Total PPH4030 |
| | 40% polypropylene homopolymer | Total PPH40306 |
| Layer B—Tie 2 (3.0 μm) | 94% polypropylene homopolymer + 6% TiO$_2$ masterbatch | Total PPH4030 + AMPACET AVK60 |
| Layer A—Inner Skin (0.75 μm) | Ethylene-propylene-butene terpolymer + syloblock | Eltex ® P KS333N8061 |

Table 7 provides a listing of prophetic non-migratory antistatic agents to be used in prophetic films 12 to 19.

TABLE 7

Compositions of Prophetic Non-migratory Antistatic Agents EM-A to EM-D

| Non-migratory Antistatic Agent | Polyether-polyolefin block copolymer (25.0 wt. %) | Propylene-based polymer (74 wt. %) | Antioxidant (1 wt. %) |
|---|---|---|---|
| EM-A | IonPhasE IPE ® | ACHIEVE ™ 6936G1 (homopolymer, MFR = 1150 g/10 min) | IRGANOX 1010 |
| EM-B | PELESTAT | ACHIEVE ™ 6936G1 (homopolymer, MFR = 1150 g/10 min) | IRGANOX 168 |
| EM-C | IonPhasE IPE ® | EXXONMOBIL ™ PP9122 (random copolymer, MFR = 2.1 g/min) | IRGANOX 1010 |
| EM-D | PELESTAT | EXXONMOBIL ™ PP9122 (random copolymer, MFR = 2.1 g/min) | IRGANOX 168 |

Table 8 shows the antistatic composition of the films. Films 12 to 15 comprise a non-migratory antistatic agent comprising a polypropylene homopolymer. Films 16 to 19 comprise a non-migratory antistatic agent comprising a propylene random copolymer.

TABLE 8

Prophetic Compositions Of Films 12 to 19

| FILM | Corona Treatment: | Non-Migratory Antistatic Agent |
|---|---|---|
| Reference | B | |
| Film 12 | B | EM-A |
| Film 13 | A and B | EM-A |
| Film 14 | B | EM-B |
| Film 15 | A and B | EM-B |
| Film 16 | B | EM-C |
| Film 17 | A and B | EM-C |
| Film 18 | B | EM-D |
| Film 19 | A and B | EM-D |

Prophetic films 12 to 19 are expected to have properties similar to inventive films 1 to 11. In particular, films 12 to 15 (a non-migratory antistatic agent comprising a propylene homopolymer) are expected to have properties similar to inventive films 7 to 11 (non-migratory antistatic agent comprises a propylene homopolymer).

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" relates to the terms "consisting essentially of," "is," and "consisting of" and anyplace "comprising" is used "consisting essentially of," "is," or "consisting of" may be substituted therefor.

We claim:
1. A multilayer printable polymeric film comprising:
(a) at least one layer A, comprising one or more polyolefins, having a first side and a second side;
(b) a layer B, comprising one or more polyolefins, having a first side and a second side, where the first side of B is located on the second side of the at least one layer A,

(c) a printable coating located on the first side of the at least one layer A; and (d) an inner skin layer located adjacent to the second side of the layer B;

wherein at least one layer of the at least one layer A or the layer B comprises 5.0 to 50 wt. % of at least one polyether-polyolefin block copolymer, based a weight of polymers comprising the at least one layer, and a remaining wt. % of the polymers in the at least one layer are propylene-based polymers;

wherein the polyether-polyolefin block copolymer is a non-migratory antistatic agent; and wherein the multilayer printable polymeric film has a kinetic coefficient of friction less than about 0.65 and a surface tension of greater than about 35 mN/m on at least one side of the multilayer printable polymeric film.

2. The multilayer printable polymeric film of claim 1, having a surface resistivity in a range of from about $10^6$ to about $10^{12}$ ohms/square, measured at 47% RH and 21.5° C.

3. The multilayer printable polymeric film of claim 1, wherein the at least one layer A and/or the layer B is propylene-based.

4. The multilayer printable polymeric film of claim 1, further comprising an adhesive primer.

5. The multilayer printable polymeric film of claim 1, wherein the film is printed.

6. The multilayer printable polymeric film of claim 1, wherein a whiteness of the multilayer printable polymeric film is greater than 70%.

7. A printable article comprising a multilayer polymeric film having:

(a) at least one layer A, comprising one or more polyolefins, having a first side and a second side, and also comprising from 5.0 to 50 wt. % of at least one polyether-polyolefin block copolymer, based on a weight of polymers comprising the at least one layer A, and a remaining wt. % of the polymers in the at least one layer A are propylene-based polymers, wherein the polyether-polyolefin block copolymer is a non-migratory antistatic agent;

(b) a layer B, comprising one or more polypropylene homopolymers, having a first side and a second side, where the first side of layer B is located on the second side of the at least one layer A;

(c) a printable coating located on the first side of the at least one layer A; and (d) an inner skin layer located adjacent to the second side of layer B comprising an ethylene-propylene copolymer or ethylene-propylene-butene terpolymer;

wherein the multilayer polymeric film has a kinetic coefficient of friction less than 0.65 and a surface tension of greater than about 35 mN/m on at least one side of the multilayer polymeric film.

8. The printable article of claim 7, wherein the printable coating is printed.

9. The printable article of claim 7, wherein the article is a label.

10. The printable article of claim 7, wherein there is at least one tie-layer between the at least one layer A and the layer B.

11. The printable article of claim 10, wherein the at least one tie-layer comprises polypropylene homopolymer.

12. The printable article of claim 7, wherein the layer B also comprises at least one cavitating agent.

13. The printable article of claim 10, wherein the at least one tie-layer also comprises at least one pigment.

14. The printable article of claim 10, wherein the at least one layer A comprises from 5.0 to 35 wt. % of the at least one polyether-polyolefin block copolymer.

15. The printable article of claim 1, wherein the at least one layer A comprises from 5.0 to 35 wt. % of at least one polyether-polyolefin block copolymer.

* * * * *